(12) United States Patent
Ho et al.

(10) Patent No.: US 7,559,066 B2
(45) Date of Patent: Jul. 7, 2009

(54) CICS BMS (BASIC MESSAGE SERVICE) META MODEL

(75) Inventors: Shyh-Mei F. Ho, Cupertino, CA (US); Andrzej McColl Krasun, Broughton (GB); Benjamin Johnson Sheats, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 09/849,793

(22) Filed: May 4, 2001

(65) Prior Publication Data

US 2002/0042849 A1 Apr. 11, 2002

Related U.S. Application Data

(60) Provisional application No. 60/223,671, filed on Aug. 8, 2000.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |

(52) U.S. Cl. .................................. 719/330; 709/246
(58) Field of Classification Search .................. 703/26; 717/114; 709/315, 246, 203; 719/329, 311, 719/330; 707/4
See application file for complete search history.

(56) References Cited

U.S. PATENT DOCUMENTS

| | | | | |
|---|---|---|---|---|
| 5,604,896 A | * | 2/1997 | Duxbury et al. | ............... 703/26 |
| 5,634,127 A | * | 5/1997 | Cloud et al. | ................ 719/313 |
| 5,754,772 A | * | 5/1998 | Leaf | ............................ 709/203 |

(Continued)

OTHER PUBLICATIONS

Merlo et al., "Reengineering User Interfaces," IEEE Software, vol. 12, Issue 1, Jan. 1995; pp. 64-73.*

(Continued)

*Primary Examiner*—Lewis A Bullock, Jr.
*Assistant Examiner*—Nathan Price
(74) *Attorney, Agent, or Firm*—Patterson & Sheridan, LLP

(57) ABSTRACT

A method of processing a transaction on an end user application and an application server. This is accomplished by initiating the transaction on the end user application in a first language (such as a markup language) with a first application program (such as a Web browser), and transmitting the transaction to the server and converting the transaction from the first language of the first end user application to a language running on the application server, processing the transaction on the application server, and transmitting the transaction from the application server back to the end user application, and converting the transaction from the language running on the application server to the language of the end user application. The end user application and the application server have at least one connector between them, and the steps of (i) converting the transaction from the language of the end user application (as a source language) to the language running on the application server (as a target language), and (ii) converting the transaction from the language running on the application server (as a source language) to the language of the end user application (as a target language), each include the steps of invoking connector metamodels of the respective source and target languages, populating the connector metamodels with metamodel data of each of the respective source and target languages, and converting the source language to the target language.

7 Claims, 7 Drawing Sheets

U.S. PATENT DOCUMENTS

| | | | |
|---|---|---|---|
| 5,761,656 A * | 6/1998 | Ben-Shachar | 707/4 |
| 6,067,579 A * | 5/2000 | Hardman et al. | 719/328 |
| 6,094,688 A | 7/2000 | Mellen-Garnett et al. | |
| 6,233,542 B1 | 5/2001 | Butts et al. | |
| 6,243,737 B1 * | 6/2001 | Flanagan et al. | 709/202 |
| 6,253,366 B1 | 6/2001 | Mutschler, III | |
| 6,256,676 B1 * | 7/2001 | Taylor et al. | 709/246 |
| 6,292,932 B1 * | 9/2001 | Baisley et al. | 717/114 |
| 6,574,673 B1 * | 6/2003 | Hari et al. | 719/310 |
| 6,654,784 B1 | 11/2003 | Wei | |
| 6,738,975 B1 | 5/2004 | Yee et al. | |
| 6,889,260 B1 * | 5/2005 | Hughes | 709/246 |
| 7,130,807 B1 * | 10/2006 | Mikurak | 705/7 |
| 2003/0058277 A1 * | 3/2003 | Bowman-Amuah | 345/765 |
| 2003/0191970 A1 | 10/2003 | Devine et al. | |

OTHER PUBLICATIONS

Deborin et al., "CICS Transaction Server for OS/390: Web Interface and 3270 Bridge," SG24-5243-00, International Technical Support Organization, International Business Machines Corporation, 1998.*

"CICS Transaction Server for OS/390: Version 1 Release 2 Implementation Guide," SG24-2234-00, International Technical Support Organization, International Business Machines Corporation, 1997.*

James Martin, "Principles of Object-Oriented Analysis and Design", Oct. 29, 1992, Chapter 1-22.

"Quarterdeck Mosaic User Guide", 1995, Chapters 1-7.

* cited by examiner

| BMSMapset |
|---|
| base : String |
| color : BMSColorType |
| control : BMSControlType |
| cursorLocation : boolean |
| data : BMSDataType |
| descriptionAttributes : BMSMapAttributesType |
| extendedAttributes : BMSExtendedAttributesType |
| fieldSeparator : String |
| fold : BMSFoldType |
| highlighting : BMSHighlightingType |
| horizontalTabs : int |
| language : BMSLanguageType |
| logicalDeviceCode : int |
| mapAttributes : BMSMapAttributesType |
| mode : BMSModeType |
| outboardFormatting : boolean |
| outlining : BMSOutliningType |
| partition : String |
| programmedSymbol : String |
| shiftOutShiftIn : boolean |
| storage : boolean |
| suffix : String |
| terminal : String |
| tiooPrefix : boolean |
| transparent : boolean |
| trigraph : boolean |
| type : BMSMapsetType |
| validation : BMSValidationType |
| vericalTabs : int |

| BMSMap |
|---|
| column : String |
| color : BMSColorType |
| control : BMSControlType |
| cursorLocation : boolean |
| data : BMSDataType |
| descriptionAttributes : BMSMapAttributesType |
| extendedAttributes : BMSExtendedAttributesType |
| fields : boolean |
| fieldSeparator : String |
| header : boolean |
| highlighting : BMSHighlightingType |
| justify : BMSJustifyType |
| line : String |
| mapAttributes : BMSMapAttributesType |
| outboardFormatting : boolean |
| outlining : BMSOutliningType |
| partition : String |
| programmedSymbol : String |
| shiftOutShiftIn : boolean |
| size : BMSSizeType |
| terminal : String |
| tiooPrefix : boolean |
| trailer : boolean |
| transparent : boolean |
| validation : BMSValidationType |

| BMSField |
|---|
| attributes : BMSAttributesType |
| case : boolean |
| color : BMSColorType |
| group : String |
| highlighting : BMSHighlightingType |
| initialValue : String |
| justify : BMSJustifyType |
| length : int |
| occurs : int |
| outlining : BMSOutliningType |
| pictureInput : String |
| pictureOutput : String |
| position : BMSPositionType |
| programmedSymbol : String |
| shiftOutShiftIn : String |
| transparent : boolean |
| validation : BMSValidationType |

FIG. 10A

BMSStatement
label : String
comments : String

<<enumeration>> BMSFoldType
lower
upper

<<enumeration>> BMSLanguageType
assembler
c
cobol
cobol2
pli

<<enumeration>> BMSValidationType
mustFill
mustEnter
trigger
userExit

<<enumeration>> BMSExtendedAttributesType
no
yes
maponly

<<enumeration>> BMSDataType
field
block

<<enumeration>> BMSHighlightingType
off
blink
reverse
underline

BMSJustifyType
left : boolean
right : boolean
first : boolean
last : boolean
bottom : boolean

BMSOutliningType
box : boolean
left : boolean
right : boolean
over : boolean
under : boolean

BMSPositionType
line : int
column : int
number : int

BMSSizeType
line : int
column : int

<<enumeration>> BMSControlType
print
length
freekb
alarm
frset

<<enumeration>> BMSModeType
out
in
inout

<<enumeration>> BMSColorType
default
blue
red
green
pink
turquoise
yellow
neutral

<<enumeration>> BMSMapsetType
dsect
map
final

BMSAttributesType
skip : boolean
bright : boolean
detectable : boolean
dark : boolean
modified : boolean
cursor : boolean
normal : boolean
numeric : boolean
protected : boolean

BMSMapAttributesType
color : boolean
highlighting : boolean
outline : boolean
programmedSymbol : boolean
sosi : boolean
transparent : boolean
validaiton : boolean

*FIG. 10B*

CICS BMS (BASIC MESSAGE SERVICE) META MODEL

CROSS REFERENCE TO RELATED APPLICATION

This application claims the benefit under Title 35, United States Code, Sections 111(b) and 119(e), relating to Provisional Patent Applications, of the filing date of U.S. Provisional Patent Application Ser. No. 60/223,671 filed Aug. 8, 2000 of Steven A. Brodsky and Shyh-Mei Ho for EAI Common Application Metamodel.

This application is also related to the following United States Patent Applications and Patent, filed on even date herewith:

Co-pending U.S. application, Ser. No. 09/849,107, filed on May 4, 2001, and entitled "COMMON APPLICATION METAMODEL INCLUDING C/C++ METAMODEL" by Shyh-Mei Ho, Stephen Brodsky, and James Rhyne, Co-pending U.S. application, Ser. No. 09/849,813, filed on May 4, 2001, and entitled "COBOL METAMODEL" by Shyh-Mei Ho, William Nicholas John Tindall, James Rhyne, Tony Tsai, Alan Roeder Elderon, and Shahaf Abileah.

Co-pending U.S. application, Ser. No. 09/849,563, filed on May 4, 2001, and entitled "PL/I METAMODEL" by Shyh-Mei Ho, Alan Roeder Elderon, Eugene Dong and Tony Tsai.

Issued U.S. patent, U.S. Pat. No. 6,775,680, filed on May 4, 2001, and entitled "HIGH LEVEL ASSEMBLER METAMODEL" by Shyh-Mei Ho, John Ehrman, Benjamin Sheats, and Jenny Hung.

Co-pending U.S. application, Ser. No. 09/849,377, filed on May 4, 2001, and entitled "TYPE DESCRIPTOR METAMODEL" by Shyh-Mei Ho, James Rhyne, Alan Roeder Elderon, William Nicholas John Tindall, and Tony Tsai.

Co-pending U.S. application, Ser. No. 09/849,816, filed on May 4, 2001, and entitled "IMS TRANSACTION MESSAGES METAMODEL" by Shyh-Mei Ho, and Shahaf Abileah.

Co-pending U.S. application, Ser. No. 09/849,105, filed on May 4, 2001, and entitled "IMS-MFS (MESSAGE FORMAT SERVICE) METAMODEL" by Shyh-Mei Ho, Benjamin Sheats, Elvis Halcrombe, and Chenhuei J. Chiang.

FIELD OF THE INVENTION

The invention relates to exchanging instructions and/or data between applications to signal readiness to transfer, exchange, or process data, or to establish at least one or more parameters for transferring data between the applications, and controlling the parameters in order to facilitate data transfer and communication. The invention further relates to integrating dissimilar applications one executing within one platform and another executing in another platform, e.g., multiple computers, multiple operating systems, multiple application components, multiple development environments, multiple deployment environments, or multiple testing and processing, establishing a dialog (e.g., a negotiation) with one another in order to establish connectivity for transferring data and/or instructions between the applications so as to facilitate performing tasks on the data or portions thereof to accomplish an overall goal. The parameters may include one or more of format, data types, data structures, or commands.

BACKGROUND

The growth of e-business has created a significant need to integrate legacy applications and bring them to the Internet. This is because the current trend for new applications is to embrace Web standards that simplify end user application construction and scalability. Moreover, as new applications are created, it is crucial to seamlessly integrate them with existing systems while facilitating the introduction of new business processes and paradigms.

Integrating new applications with existing applications is especially critical since industry analysts estimate that more than seventy percent of corporate data, including data highly relevant to e-commerce, lives on mainframe computers. Moreover, while many e-commerce transactions are initiated on Windows, Mac, and Linux end user platforms, using a variety of Web browsers, and go through Windows NT and Unix servers, they are ultimately completed on mainframe computers, running mainframe applications, and impacting data stored in mainframe databases.

There are e-business pressures to integrate server level applications and bring them to the Internet. However, there is no complete and easy mechanism to integrate or e-business enable the applications. Integration, whether through messaging, procedure calls, or database queries, is key to solving many of today's business problems.

Integrating legacy applications with new software is a difficult and expensive task due, in large part, to the need to customize each connection that ties together two disparate applications. There is no single mechanism to describe how one application may allow itself to be invoked by another.

One consequence is an e-commerce environment of multiple applications, developed by multiple development teams, running on different platforms, with different data types, data structures, commands, and command syntax's. This environment is stitched together with application program interfaces and connectors. Connectors are an essential part of the total application framework for e-commerce. Connectors match interface requirements of disparate applications and map between disparate interfaces.

This growing interconnection of old and new software systems and applications, has led to various middle ware applications and connector applications, interface specifications, interface definitions, and code, especially for the interconnection and interaction of markup languages (such as HTML, XML, Dynamic HTML, WML, and the like), through object oriented languages such as SmallTalk and C++, with languages of legacy application server applications (such as COBOL). These interface specifications, definitions, and code should apply across languages, tools, applications, operating systems, and networks so that an end user experiences the look, feel, and responses of a single, seamless application at her terminal. Instead, the proliferation of standards, protocols, specifications, definitions, and code, e.g., Common Object Request Broker (CORBA), Common Object Model (COM), Object Linking and Embedding (OLE), SOM, ORB Plus, Object Broker, Orbix, has instead created an e-commerce "Tower of Babel."

Examples of application integration are ubiquitous: from installing an ERP system, to updating an Operational Data Store (ODS) with IMS transactions or invoking CRM systems from MQSeries; each of these requires the same basic steps. First, a user must find the entity she wants to communicate with, then she must figure out how to invoke the entity, and finally she must provide translation from one native representation to another. Today, these steps usually require manual investigation and hand coding—and leave the developers with a rat's-nest of hard-to-maintain connections between applications.

Attempts to remedy this situation involve application program interfaces and connectors, which are frequently built on Interface Definition Languages. Interface Definition Languages are declarative, defining application program interfaces, and, in some cases, issues such as error handling. Most Interface Definition Languages are a subset of C++, and specify a component's attributes, the parent classes that it inherits from, the exceptions that it raises, the typed events that it emits, the methods its interface supports, input and output parameters, and data types. The goal of Interface Definition Languages within connectors is to enable collaboration between dissimilar applications without hard coded application program interfaces.

Ideally, the interface definition language, and the connector of which it is a part, should facilitate full run-time software application collaboration through such features as Method invocation with strong type checking, Run-time method invocation with greater flexibility and run time binding, High level language binding, with the interface separated from the implementation.

An interface repository containing real time information of server functions and parameters.

Additionally, the connector and its interface definition language, should be fast, efficient, scalable, portable, support metaclasses, support syntactic level extensions, and support semantic level extensions.

SUMMARY OF THE INVENTION

The problems associated with integrating new applications, for example, e-commerce applications, with legacy applications are obviated by the Common Application Metamodel tool, method, and system described herein. The Common Application Metamodel method, tool, and system of the invention facilitate tooling solutions, data translation, and communication and collaboration between dissimilar and disparate applications, as well as full run-time software application collaboration through an interface with the application server interface domain. This is accomplished through metadata interchange information, method invocation with strong type checking, run-time method invocation, run time binding, and high level language binding, with the interface separated from the implementation, and an interface repository containing real time information of client and server interface parameters.

Additionally, the tool, method, and system of the invention provide fast, efficient, and scalable interconnectivity independently of any tool or middleware, are reusable and portable, and support metaclasses, syntactic level extensions, and semantic level extensions, and are independent of any particular tool or middleware.

The Common Application Metamodel tool, method, and system is especially useful for providing a data transformer that is bidirectional between a client application and a server application, transmitting commands and data both ways between, for example, a Java, HTML, XML, C, or C++ application and a COBOL, PL/I, or High Level Assembler application, or, between an HTML or XML application and a Java, C, or C++ application, or between a Java application and a C or C++ application.

In a preferred embodiment of the invention, the metamodel is used in a mapping support language environment for processing an application request on an end user application and an application server where the server includes a mapping support language. In this embodiment an application request is initiated on the end user application in a first language with a first application program, and transmitted to the server where it is converted from the first language of the first end user application to a form for the mapping support language running on the application server. The application request is processed on the application server and a response is transmitted from the application server to the end user application. The response to the application request is converted from the language and form of mapping support language running on the application server to the first language of the first end user application. The end user application and the application server have at least one connector therebetween. In this way steps of (i) converting the application request from the first language of the first end user application as a source language to the language (including the form of the transaction message message formatter) running on the application server as a target language, and (ii) converting a response to the application request from the language (including the form of the transaction message message formatter) running on the application server as a source language to the first language of the first end user application as a target language, each comprise the steps of: invoking connector metamodels of respective source language and target mapping support language; populating the connector metamodels with metamodel data of each of the respective source language and target mapping support language, the metamodel data of the target mapping support language including a map, a mapset, and a mapfield; and converting the source language to the mapping support language. To be noted is that the metamodel data of the target mapping support language including a map, a mapset, and a mapfield One embodiment of the invention is a method of processing a transaction on or between an end user application and one or more application servers. The method comprises the steps of initiating the transaction on the end user application in a first language with a first application program, transmitting the transaction to the server, and converting the transaction from the first language of the first end user application to a language running on the application server. Typically, as described above, the client will be a thin client or a Web browser, the application running on the client will be a Web browser application or a thin client connectivity application, and the language of the client application will be Java, C, C++, or a markup language, as HTML or a derivative of HTML, such as XML or Dynamic HTML or WML, or the like, and the language running on the server may be COBOL, PL/I, HLASM (High Level Assembler) or the like. The invention facilitates transformers which convert the transaction from the first language of the end user application to a language running on the application server. After conversion, the converted transaction is processed on the application server.

The application processes the request and then sends the response from the application server back to the end user application. Typically, as described above, the application server will be running a COBOL based application, and the client will be a thin client written in Java or C or C++, or a Web browser, running a Web browser application or a thin client connectivity application, in a markup language, as HTML or a derivative of HTML, such as XML or Dynamic HTML, or the like. The invention provides data transformers which convert the response from the language or languages running on the application server or servers to the first language of the first end user application.

The end user application and the application server have at least one data transformer between them. In this way, the steps of (i) converting the request from the first language of the first end user application as a source language to the language running on an application server as a target language, and (ii) converting the response from the language running on the application server, as a subsequent source language, back to the first language of the first end user application, as a subsequent target language, each comprise the steps of invoking type descriptor and language metamodels of respective source and target languages, populating the metamodels with each of the respective source and target languages' data items and types, and converting the source language to the target language.

The end user application is, frequently, a web browser or a thin client. When the end user application is a Web browser, the end user is connected to the application server through a web server. According to a further embodiment of the invention, the web server may comprise the connector, or data transformer. The data transformer integrated with the Web server may directly convert the request, transaction, or message from a browser oriented form to an application server language or to an intermediate, business or commerce oriented markup language, such as XML.

The CAM metamodel used to construct the converter comprises an invocation metamodel, an application domain interface metamodel, a language metamodel, and a type descriptor metamodel. Exemplary invocation metamodel includes information chosen from the group consisting of message control information, security data, transactional semantics, trace and debug information, pre-condition and post-condition resources, and user data, etc. Exemplary application domain interface metamodel comprises information chosen from input parameter signatures, output parameter signatures, and return types. Application domain interface metamodel uses one or more language metamodels, such as COBOL and PL/I metamodels.

The type descriptor metamodel defines physical realizations, storage mapping, data types, data structures, and realization constraints.

The method of the invention is applicable to situations where one of the source or target languages is object oriented, and the other of the target or source languages is not object oriented. In this situation, the language metamodel and the type descriptor metamodel together map encapsulated objects of the object oriented language into code and data of the language that is not object oriented. Additionally, the language metamodel and the type descriptor metamodel maps object inheritances of the object oriented language into references and pointers in the language that is not object oriented. The method of the invention is also applicable to situations where different object oriented languages are running on different platforms, and encapsulated objects of the source language (code and data) are mapped into encapsulated objects of the target language. The method of the invention is also applicable where different procedural languages are running on different platforms or applications and commands and data of the source procedural language are mapped into the target procedural language.

According to the method of the invention, there may be a plurality of applications for vertical (sequential, conditional, or dependent) processing, for horizontal (parallel in time) processing, or both horizontal and vertical processing. This is to support rich transactions to and through multiple hierarchical levels and multiple parallel sequences of processing. This may be the case in business to business transactions drawing upon financial, manufacturing, scheduling, supply, and shipping databases and servers, and utilizing various commercial security instruments.

A further aspect of the invention is a client-server processing system having a client, a server, and at least one transformer between the client and one or more servers, A still further aspect of the invention is a processing system configured and controlled to interact with a client application. In this aspect of the invention, the system comprises, a server, and at least one transformer between the server and the client application, where the client has an end user application, and is controlled and configured to initiate a request with the server in a first language with a first application program and to transmit the request through a transformer to the server or servers. The server processes the request in a second software application, using a second language, and returns a response to the client through a transformer.

A further aspect of the invention is a groupware system having a plurality of e-mail enabled end user applications, such as e-mail, word processing, spreadsheet, simple database management (such as Lotus Approach or Microsoft Access), graphics and graphics editing, audio and audio editing, and computer-telephony integration ("CTI"), along with client level content database client services and content replication client services. Groupware integrates these e-mail enabled applications through one or more transformers and application program interfaces with transport services, directory services, and storage services, including content servers and replication servers. The groupware system is configured and controlled to communicate among disparate end user applications, among disparate servers, and between disparate servers and end user applications. The groupware system comprises at least one transformer between a server and an end user application. The end user application is controlled and configured to participate with a server in a first language of a first application program and the server is configured and controlled to participate with the client in a second language of a second program.

The transformer is configured and controlled to receive a request from the end user application, and convert the request from the first language of the first end user application to a language running on the server. The server is configured and controlled to receive the converted request from the transformer and process the request in a second language with a second application program residing on the server, and to thereafter transmit a response through a transformer back to the end user application.

A still further embodiment of the invention is the provision of rich transaction processing. Rich transactions are nested transactions that span to, through, and/or across multiple servers. The spanning across nested servers may be horizontal, that is parallel dependent transactions, or vertical, that is, serial dependent transactions. Rich transactions may be long lived, on-going transactions, or complex business-to-business transactions, especially those with multiple dependencies or contingencies, volume and prompt payment discounts, late delivery and late payment penalties, and with financial processing, such as electronic letters of credit, electronic bills of lading, electronic payment guarantees, electronic payment, escrow, security interests in the goods, and the like. In a rich transaction environment, some transaction servers may be positioned as clients with respect to other transactions for certain sub transactions making up the rich transaction.

A still further embodiment of the invention is a tool, that is, a software developer's kit, characterized in that the program product is a storage medium (as a tape, floppy disks, a CD-ROM, or a hard drive or hard drives on one of more computers) having invocation metamodels, application domain interface metamodels, and language metamodels, and computer instructions for building a metamodel repository of source and target language metamodels. The program product also contains computer instructions for building connector stubs from the metamodels. The program product further carries computer instructions to build a transformer.

While the invention has been described in summary form as having a single level of connectors, it is, of course, to be understood that such connectors may be present at various levels in the processing hierarchy, for example between Web Clients and Web servers, between web servers and application servers, between application servers and database servers, and between application servers or database servers or both and various specialized repositories.

It is also to be understood, that while the invention has been summarized in terms of individual clients and individual servers, there may be multiple clients, multiple servers, and applications that function as both clients and servers, as exemplified by groupware applications, and there might be multiple parallel lines and/or multiple hierarchical levels of application servers, data servers, and databases, as in systems for rich transactions.

THE FIGURES

Various elements of the invention are illustrated in the FIGURES appended hereto.

Figure 5:
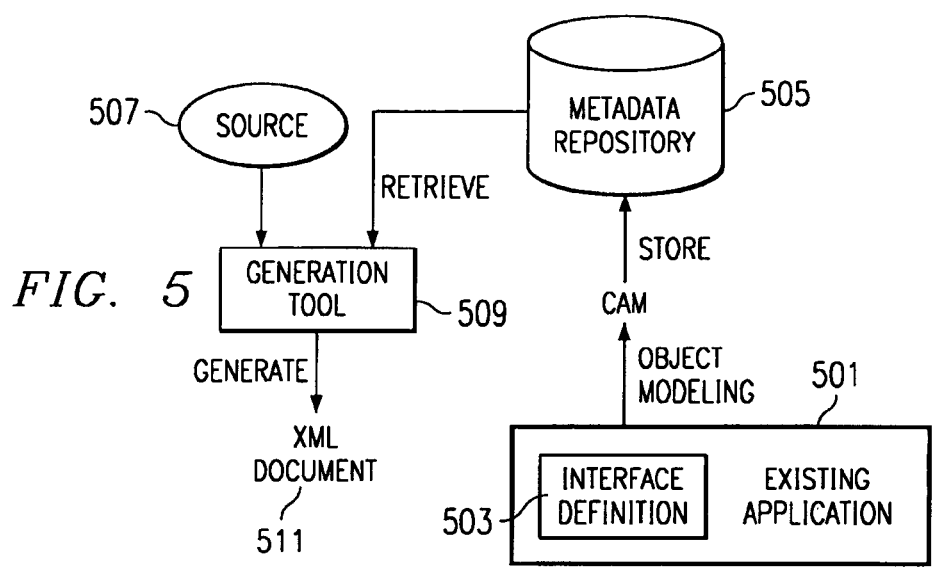

FIG. 5 illustrates how a tool can be used to generate an XML document describing application program interface. First, an object model, i.e., a CAM metamodel, is created to capture interface definitions about an application server. Then a tool reads and parses the source definitions of an application program and generates an XML document by retrieving the object model's information from a repository.

Figure 6:
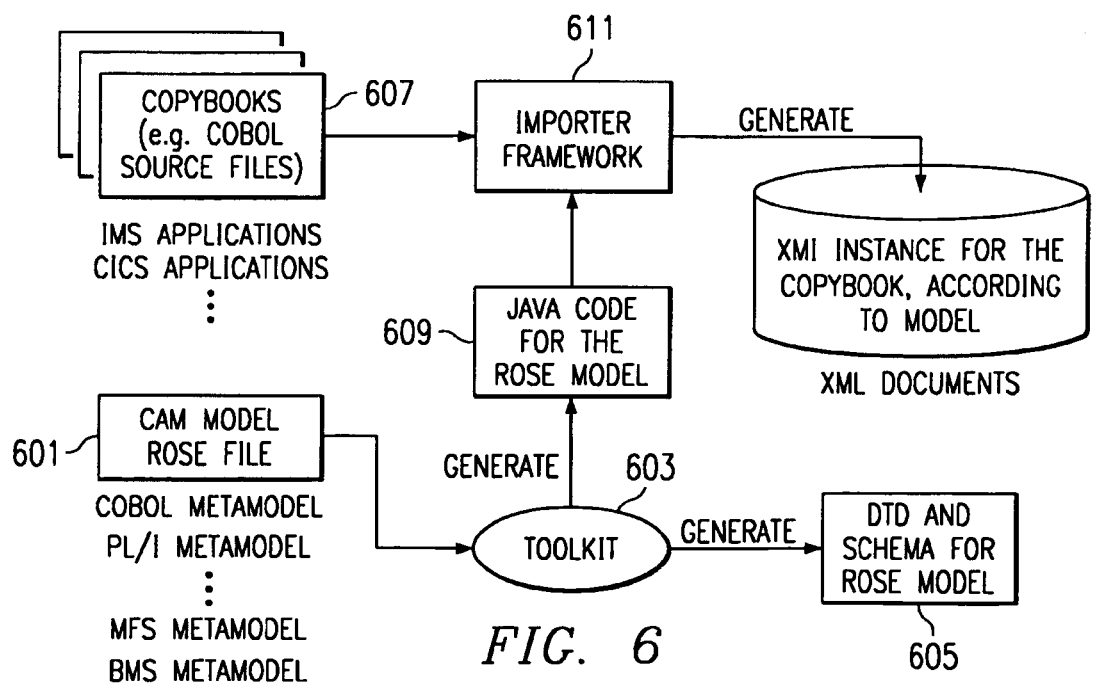

FIG. 6 illustrates a development phase scenario where a Common Application Metamodel Rose file, e.g., a COBOL metamodel, a PL/I metamodel, an MFS metamodel, a BMS model, or the like is read into a toolkit, to generate a DTD and XML schema and Java code for a Rose model. A source file of an application, as a COBOL source file, a PL/I source file, an MFS source file, a BMS source file, or the like, is read into an importer. The importer parses the source code and generates, as output, an XMI instance file, i.e., XML documents, by reading in the Java code of the Rose model of the application source files.

Figure 7:
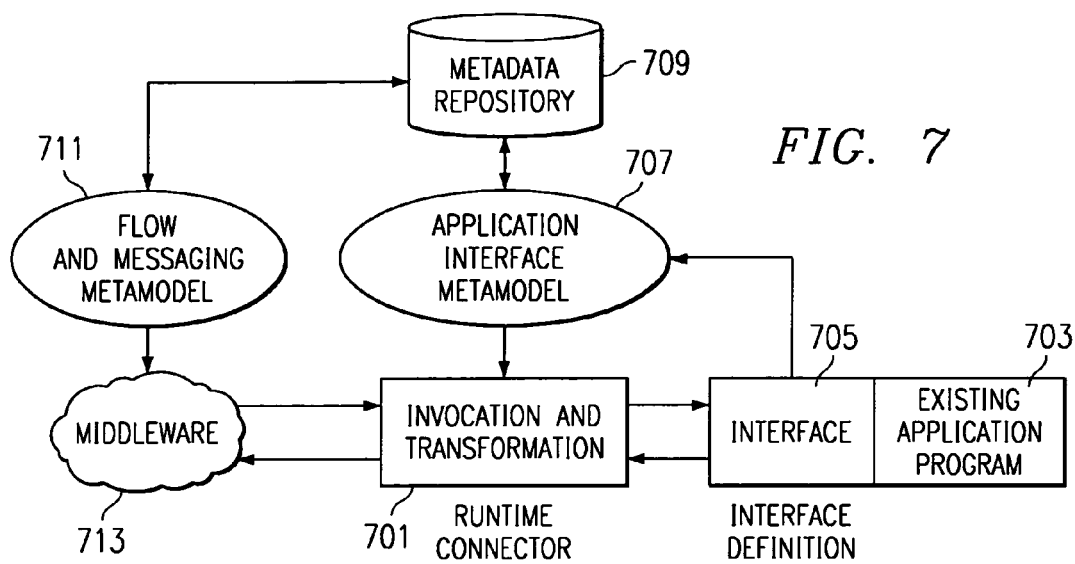

FIG. 7 illustrates a metamodel for application interfaces, which enables integration of application components into an event based messaging model, including flow models. The flow and messaging middle invokes applications through the application interface. These interfaces are access points to the applications through which all input and output is connected to the middleware. The interfaces are described in terms of the Application Interface Metamodels. Transformation processing according to he metamodel could take place in source/ client applications, target applications, or a gateway.

Figure 8:
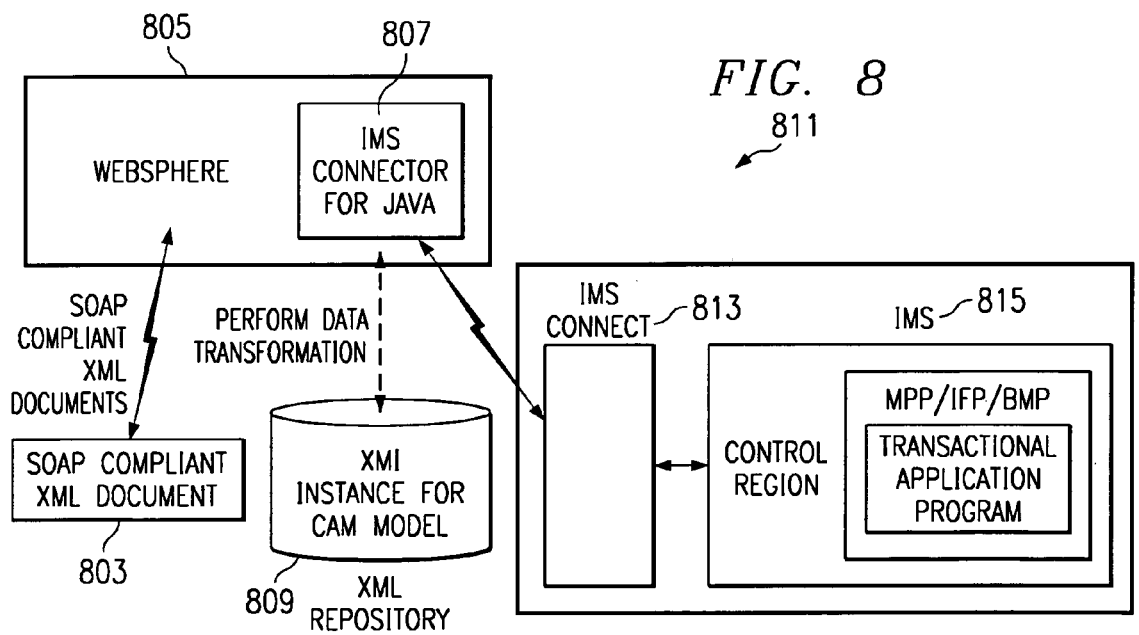

FIG. 8 illustrates the application of the Common Application Metamodel during execution time. As shown, the CAM model facilitates connectivity between a back-end IMS application and a Web file (e.g., SOAP complaint XML documents). This is accomplished by using information captured in the model to perform data transformations from one platform to another in a mixed language environment shown.

Figure 9:
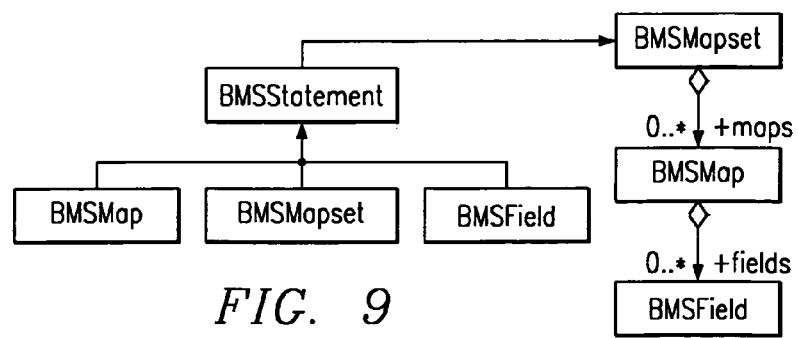

FIG. 9 illustrates a CICS BMS language metamodel, which is usable by application programs to define data structures which represent connector interfaces.

FIG. 10 illustrates attributes, fields, attribute values, maps, and attributes of the BMSMetamodel.

DETAILED DESCRIPTION OF THE INVENTION

Definitions. As used herein the following terms have the indicated meanings.

"Handshaking" is the exchange of information between two applications and the resulting agreement about which languages, capabilities, and protocols to use that precedes each connection.

An "application program interface" (API) is a passive specific method prescribed by a computer operating system or by another application program by which a programmer writing an application program can make requests of the operating system or another application. Exemplary is SAX (Simple API for XML), an connector that allows a programmer to interpret a Web file that uses the Extensible Markup Language, that is, a Web file that describes a collection of data. SAX is an event-driven interface. The programmer specifies an event that may happen and, if it does, SAX gets control and handles the situation. SAX works directly with an XML parser.

A "connector" as used herein is a dynamic, run-time, interface between platforms that stores the functions and parameters of the target platform or program, and binds with the target platform program in real time.

A "stub" is a small program routine that provides static interfaces to servers. Precompiled stubs define how clients invoke corresponding services on the server. The stub substitutes for a longer program on the server, and acts as a local call or a local proxy for the server object. The stub accepts the request and then forwards it (through another program) to the remote procedure. When that procedure has completed its service, it returns the results or other status to the stub which passes it back to the program that made the request. Server services are defined in the stub using an Interface Definition Language ("IDL"). The client has an IDL stub for each server interface that it accesses and includes code to perform marshaling. Server stubs provide static interfaces to each service exported by the server.

"CICS" (Customer Information Control System) is the online transaction processing program from IBM that, together with the Common Business Oriented Language programming language, is a set of tools for building customer transaction applications in the world of large enterprise mainframe computing. Using the programming interface provided by CICS to write to customer and other records (orders, inventory figures, customer data, and so forth) in a CICS, a programmer can write programs that communicate with online users and read from a database (usually referred to as "data sets") using CICS facilities rather than IBM's access methods directly. CICS ensures that transactions are completed and, if not, it can undo partly completed transactions so that the integrity of data records is maintained. CICS products are provided for OS/390, UNIX, and Intel PC operating systems. CICS also allows end users to use IBM's Transaction Server to handle e-business transactions from Internet users and forward these to a mainframe server that accesses an existing CICS order and inventory database.

"IMS" (Information Management System) is the system from IBM that, together with IBM's Enterprise Systems Architecture (IMS/ESA) provides a transaction manager and a hierarchical database server.

"MQ" is the MQSeries IBM software family whose components are used to tie together other software applications so that they can work together. This type of application is often known as business integration software or middleware. Functionally, MQSeries provides a communication mechanism between applications on different platforms, an integrator which centralizes and applies business operations rules, and a workflow manager which enables the capture, visualization, and automation of business processes. MQSeries connects different computer systems, at diverse geographical locations, using dissimilar IT infrastructures, so that a seamless operation can be run. IBM's MQSeries supplies communications between applications, and between users and a set of applications on dissimilar systems. Additionally, MQSeries' messaging scheme requires the application that receives a message to confirm receipt. If no confirmation materializes, the message is resent by the MQSeries.

"Rose" is an object-oriented Unified Modeling Language (UML) software design tool intended for visual modeling and component construction of enterprise-level software applications. It enables a software designer to visually create (model) the framework for an application by blocking out classes with actors (stick figures), use case elements (ovals), objects (rectangles) and messages/relationships (arrows) in a sequence diagram using drag-and-drop symbols. Rose documents the diagram as it is being constructed and then generates code in the designer's choice of C++, Visual Basic, Java, Oracle8, Corba or Data Definition Language.

Figure 1:
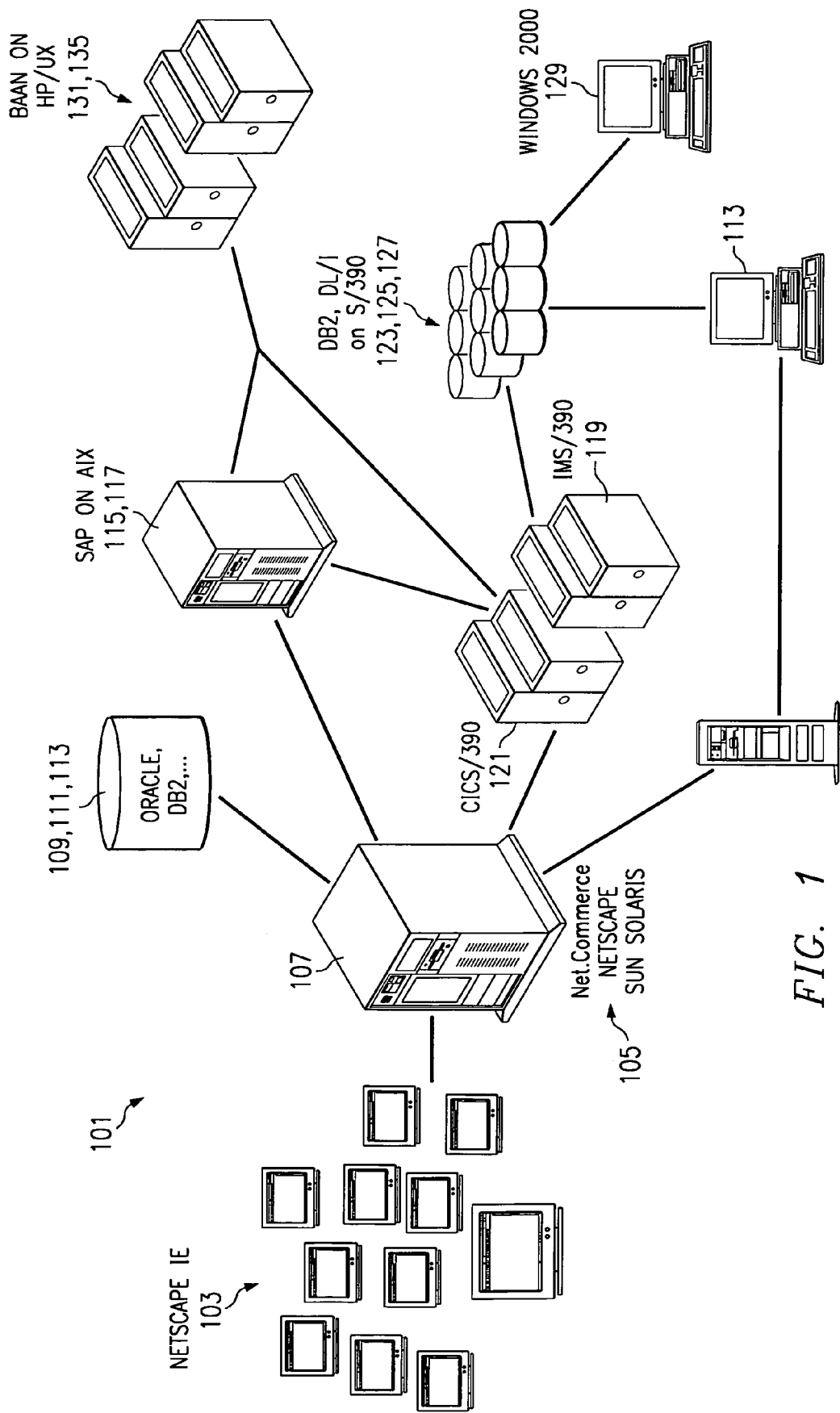
FIG. 1 illustrates a system with multiple application components, including a Netscape Internet Explorer browser, Net.Commerce on a Sun Solaris server, Oracle and DB2 on a database server, SAP running on AIX, a CICS 390 server, an IMS 390 server, DB2 and DL/I on a S/390 platform, a Windows 200 client, and Baan running on an HP Unix server.
Figure 2:
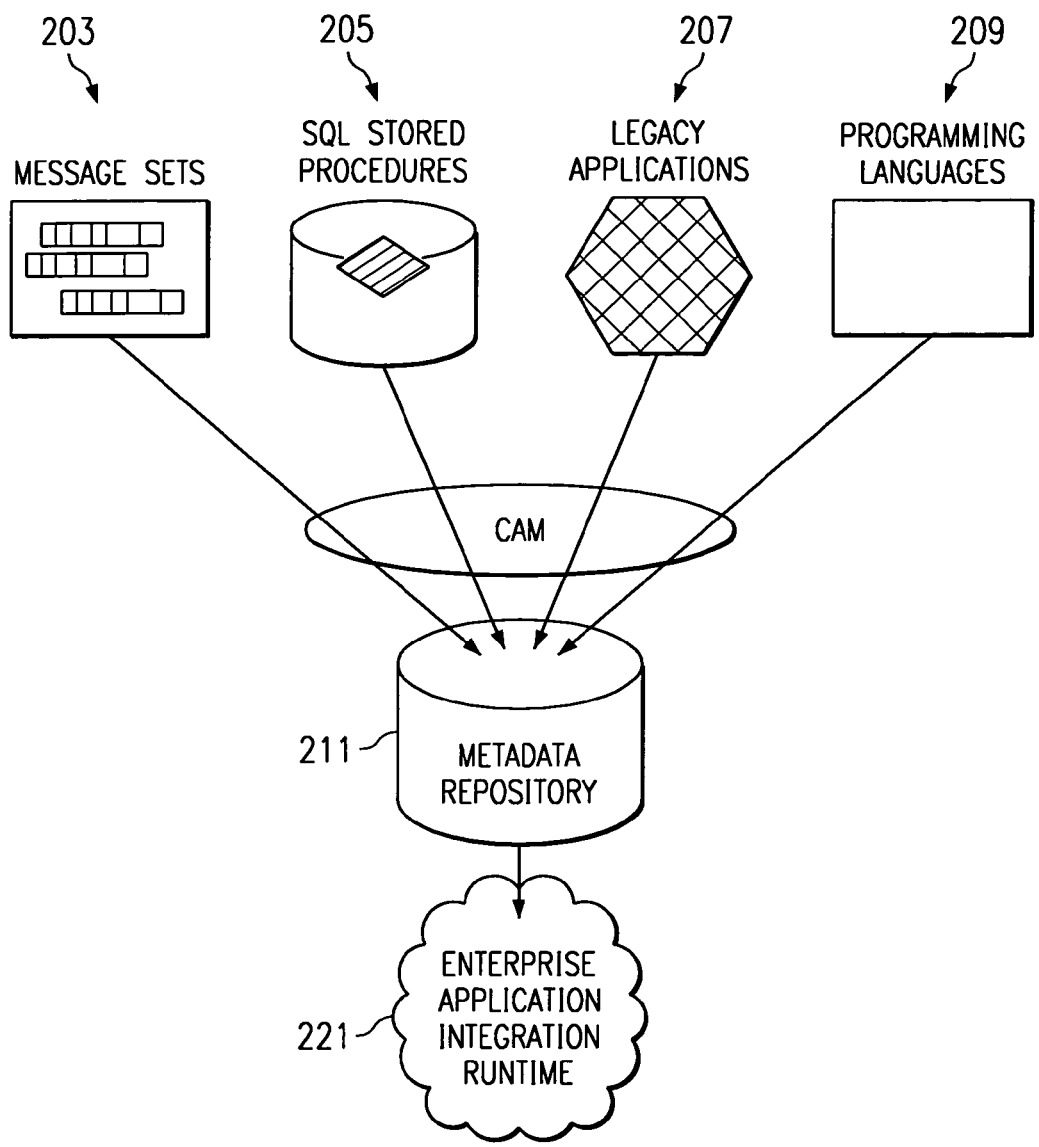
FIG. 2 illustrates the roles of message sets, SQL stored procedures, legacy applications, and programming languages as inputs to the metadata repository of the Common Application Metamodel to facilitate enterprise application integration at run time.

Common Application Metamodel Overview. The Common Application Metamodel (CAM) brings interconnectivity to the environment illustrated in FIG. 1. FIG. 1 illustrates a typical system 101 with multiple application components, including a Netscape Internet Explorer browser 103, Net.Commerce 105 on a Sun Solaris server 107, Oracle 109 and DB2 111 on a database server 113, SAP 115 running on AIX 117, a CICS 390 server 119, an IMS 390 server 121, DB2 123 and DL/I 125 on a S/390 platform 127, a Windows 2000 client 129, and Baan 131 running on an HP Unix server 133. The Common Application Metamodel (CAM) is metadata interchange method, tool, and system for marshaling and applying information needed for accessing enterprise applications, such as in FIG. 1, in a source language and converting them to a target language. CAM consists of language metamodels and application domain interface metamodels, as shown in FIG. 2, which illustrates the roles of message sets 203, SQL stored procedures 205, legacy applications 207, and programming languages 209 as inputs to the metadata repository 211 of the Common Application Metamodel to facilitate enterprise application integration 221.

Figure 3:
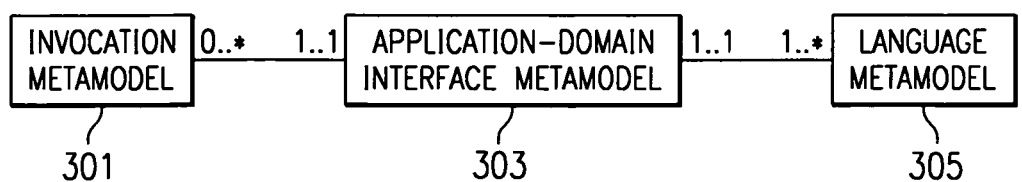
FIG. 3 illustrates that the Common Application Metamodel of the invention consists of three kinds of metamodels, i.e., an invocation metamodel, an application-domain interface metamodel, and a language metamodel. For any given application-domain metamodel it may use one or many language metamodels, and there could be zero or many invocation metamodels.

Exemplary metamodels include C, C++, Java, COBOL, PL/I, HL Assembler, IMS transaction messages, IMS MFS, CICS BMS, and MQSeries messages models, as shown in FIG. 3, which illustrates the Common Application Metamodel of the invention, with an invocation metamodel 301, an application-domain interface metamodel 303, and a language metamodel 305.

Figure 4:
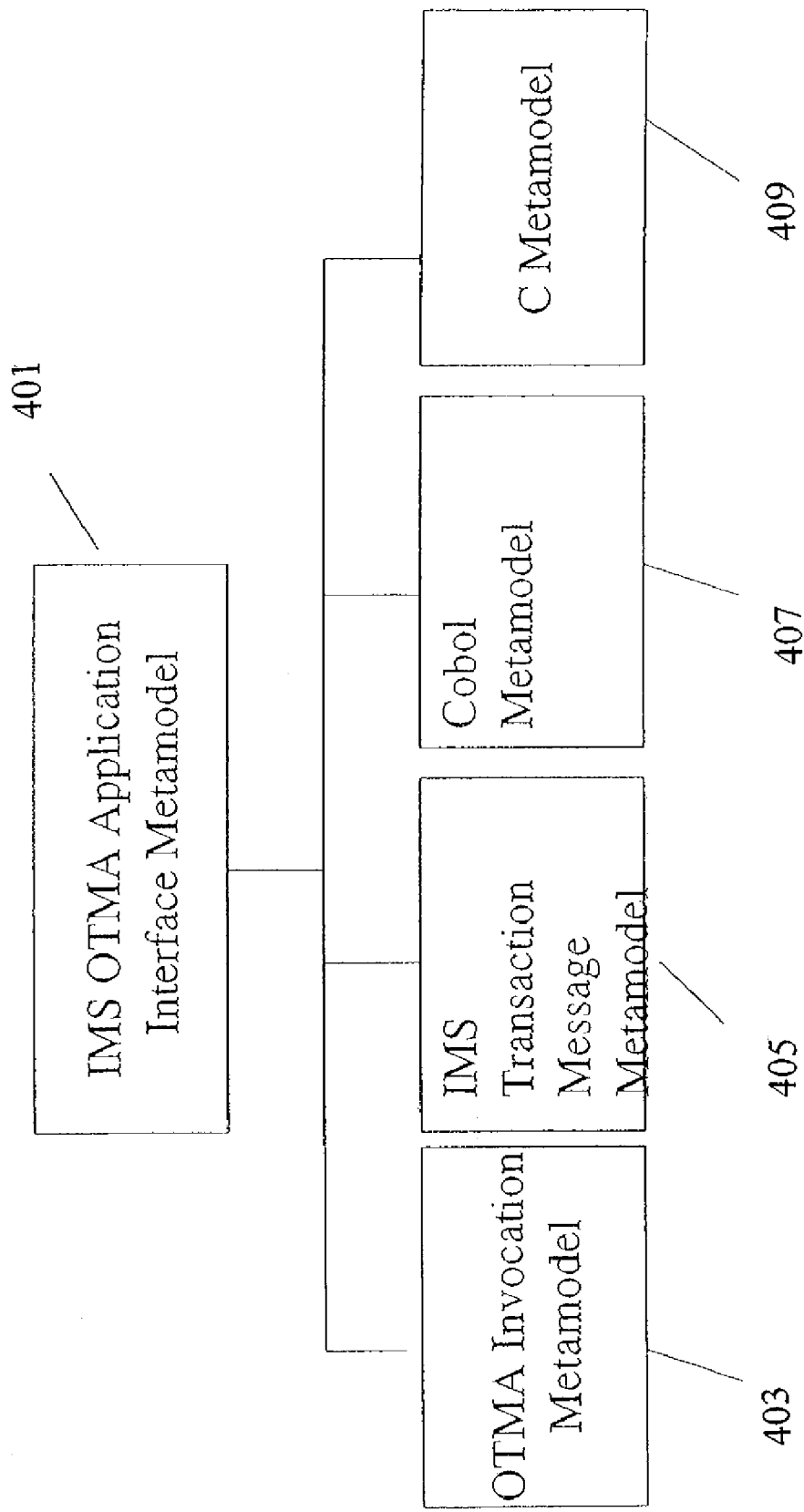
FIG. 4 illustrates an IMS OTMA metamodel, with an OTMA Invocation Metamodel, an IMS Transaction Message Metamodel application interface, which could use a COBOL Metamodel, a C Metamodel, or other language metamodels.

FIG. 4 illustrates an IMS OTMA application interface metamodel 411, with an OTMA Invocation Metamodel 421, an IMS Transaction Message Metamodel 423, a COBOL Metamodel 425, and a C Metamodel 427.

FIG. 5 illustrates the flow of information from an existing application 501, through an interface 503 to an object model containing application interface metadata. This application interface metamodel is stored in the metadata repository 505, and, at an appropriate time, retrieved from the metadata repository 505, combined with a source program 507 in a generation tool 509, and used to generate a target file 511, as an XML file, i.e., an XMI instance file. CAM is highly reusable and independent of any particular tool or middleware.

Development Stage. With CAM, tooling can now easily provide solutions to access enterprise applications, e.g. IMS applications. By parsing each source file and generating XML documents based on the CAM model, COBOL copybook, PL/I copybook, MFS Source, BMS Source, etc., tools can provide connector solutions to IMS, and CICS, etc.

In this regard, FIG. 6 illustrates a development phase scenario where a Common Application Metamodel Rose file 601, e.g., a COBOL metamodel, a PL/I metamodel, an MFS metamodel, a BMS model, or the like is read into a toolkit 603, to generate a DTD and schema for a Rose model and Java code for a Rose model 605. A source file of an application 607, as a COBOL source file, a PL/I source file, an MFS source file, a BMS source file, or the like, and the Java code for the Rose model 609 are read into an Importer 611. The importer parses the source code and provides, as output, an XMI instance file 613, i.e., XML documents, of the application source files.

FIG. 7 shows a CAM metamodel for application interfaces. This Figure depicts a runtime connector 701 with invocation and transformation capabilities, interfacing with an existing application program 703 through an interface 705 containing the existing application program's interface definition, in accordance with the application interface metamodel 707. The Application Interface metadata is stored in a metadata repository 709.

The flow and messaging middleware 713 invokes applications 703 through the application interfaces 705. These interfaces 705 are the access points to the applications 703 through which all input and output is connected to the middleware 713. The interfaces 705 are described in terms of the Application Interface Metamodel. Transformation processing according to the metamodel could take place in source/client applications, target applications, or a gateway.

Because CAM also provides physical representation of data types and storage mapping to support data transformation in an enterprise application integration environment, it enables Web services for enterprise applications.

At development time CAM captures information that facilitates:
 a). connector and/or connector-builder tools,
 b). data driven impact analysis for application productivity and quality assurance, and
 c). viewing of programming language data declarations by developers.

The CAM metamodel files are inputs to toolkits used to generate DTD files, XML schemas, and Java classes which represent the CAM model. Importers parse each source file (e.g. COBOL or PL/I copybook, MFS source, and BMS, etc.), and then generate XML documents (i.e. XML instance files) based on Java classes generated by the XMI/MOF2 toolkit.

Run Time. At run time CAM provides information which facilitates transformation in an enterprise application integration environment where it provides data type mapping between mixed languages, facilitates data translations from one language and platform domain into another.

FIG. 8 illustrates the application of the Common Application Metamodel during run time. As shown, SOAP compliant XML documents 803 are received in, for example, IBM WebSphere middleware, 805, which contains a CICS Connector 807, and is in contact with an XML Repository 809, containing the XMI instance files for the CAM model. The IBM WebSphere middleware sends the transformed file to the CICS system 811, which contains an instance of the CICS transactional application program 815. CAM facilitates connectivity between the back-end CICS application 815 and the Web file (e.g., SOAP compliant XML documents) 803. The CAM accomplishes this by using CAM model information (from repository 809) to perform data transformations from one platform to another in the mixed language environment shown.

Type Descriptor Metamodel. One important feature provided by CAM is the Type Descriptor metamodel. The Type Descriptor metamodel defines the physical realization, storage mapping, and the constraints on the realization (such as justification). This metamodel provides a physical representation of individual fields of a given data structure. When supporting data transformation in an enterprise application integration environment, the model provides data type mapping between mixed languages. It also facilitates data translations from one language and platform domain into another. The metamodel is used for runtime data transformation (or marshaling) with a language-specific metamodel for overall data structures and field names.

1. Common Application Metamodel for Application Interfaces

The interconnection of disparate and dissimilar applications running on different software platforms, as shown in FIG. 1, with different operating systems, physical platforms, and physical realizations is accomplished through connectors that incorporate the interconnection metadata. Connectors are a central part of the application framework for e-business. The end user demand is to connect to anything interesting as quickly, and as easily, as possible.

A connector is required to match the interface requirements of the adapter and the legacy application. It is also required to map between the two interfaces. Standardized metamodels for application interfaces presented herein allow reuse of information in multiple connector tools. These standardized metamodels not only reduce work to create a connector, but also reduce work needed to develop connector builder tools.

The connectors built using the common application metamodel of our invention provide interoperability with existing applications. The connectors support leveraging and reuse of data and business logic held within existing application systems. The job of a connector is to connect from one application system server "interface" to another. Therefore, an application-domain interface metamodel describes signatures for input and output parameters and return types for a given application system domain (e.g. IMS, MQSeries); it is not for a particular IMS or MQSeries application program. The metamodel contains both syntactic and semantic interface metadata.

1.a. End-to-end Connector Usage Using Common Application Metamodel

The Common Application Metamodel (CAM) consists of meta-definitions of message signatures, independent of any particular tool or middleware. Different connector builder tools can use this information to ensure the "handshaking" between these application programs, across different tools, languages, and middleware. For example, if you have to invoke a MQSeries application, you would need to build a MQ message using data from a GUI tool and deliver it using the MQ API. Similarly, when you receive a message from the MQSeries application, you would need to get the buffer from MQSeries, parse it and then put it into a GUI tool data structure. These functions can be designed and implemented efficiently by a connector builder tool using CAM as standardized metamodels for application interfaces.

CAM can be populated from many sources, including copy books, to generate HTML forms and JavaServer Page (JSP) for gathering inputs and returning outputs. An example of a connector as depicted in the previous figure is that the flow and message middleware makes a function call to an enterprise application by calling the connector which then calls the enterprise application API. The connector does language and data type mappings, for example, to translate between XML documents and COBOL input and output data structures based on CAM. Connectors and CAM provide the end-to-end integration between the middleware and the enterprise applications.

Using IMS as an example. Let's say that you must pass an account number to an IMS transaction application program from your desktop to withdraw $50.00. With CAM and a connector builder tool, you will first generate an input HTML form and an output JSP; and develop a middleware code necessary to support the request. The desktop application fills the request data structure (i.e. an input HTML form) with values and calls the middleware. The middleware service code will take the data from the GUI tool, build an IMS Connect XML-formatted message, and deliver the message to the IMS gateway (i.e. IMS Connect) via TCP/IP. IMS Connect translates between the XML documents and the IMS message data structures in COBOL using the metadata definitions captured in CAM. It then in turn sends the IMS message data structures to IMS via Open Transaction Manager Access (OTMA). The IMS COBOL application program runs, and returns the output message back to the middleware service code via IMS Connect. The middleware service code gets the message and populates the output JSP page (i.e. previously generated GUI tool reply data structures) with the reply data. The transaction output data will then be presented to the user.

2. Common Application Metamodel

CAM is used to describe information needed to easily integrate applications developed in common programming models with other systems. The CAM metamodel can be used for both synchronous and asynchronous invocations.

2. a. Common Application Metamodel

The common application metamodel depicted as follows consists of an invocation metamodel and an application-domain interface metamodel which uses language metamodels. For any given application-domain interface metamodel, it may use one or many language metamodels, but, there could be zero or more invocation metamodels.

The common connector metamodel is illustrated in FIG. 3. It has an Invocation Metamodel 301, an Application-Domain Interface Metamodel 303, and a Language Metamodel 305.

2.a.i. Invocation Metamodel

The invocation metamodel 301 consists of one or more of the following possible metadata elements. However, for a particular invocation, it could include only one or many of the following metadata elements.

Message-control information. This includes message control information, such as the message connection name, message type, sequence numbers (if any), and various flags and indicators for response, commit-confirmation, and processing options by which a client or server can control message processing to be synchronous or asynchronous, etc.

The connection name can be used by the application system server to associate all input and output with a particular client. The message type specifies that the message is a response message; or that commit is complete. It can also indicate server output data to the client, or client input data to the server.

Security data—This includes authentication mechanism, and security data, e.g. digital certificates, identity, user name and password, etc. It may also include authorization information to indicate whether the data can be authorized via a role based or ACL (access control list) based authorization.

Transactional semantics—This will carry transaction information, e.g. local vs. global transaction; two-phase commit vs. one-phase commit, and transaction context, etc.

Trace and debug—Trace and debugging information are specified as part of the metamodel.

Precondition and post-condition resource—This describes application state precondition and post-condition relationships.

User data—This includes any special information required by the client. It can contain any data.

2. a. ii. Application-Domain Interface Metamodel

The application-domain interface metamodel 303, as discussed earlier, describes signatures for input and output parameters and return types for application system domains.

2. a, iii. Language Metamodel

The language metamodel 305, e.g. COBOL metamodel, is used by enterprise application programs to define data structures (semantics) which represent connector interfaces. It is important to connector tools to show a connector developer the source language, the target language, and the mapping between the two. The CAM language metamodel also includes the declaration text in the model which is not editable (i.e. read-only model). Because the connector/adapter developer would probably prefer to see the entire COBOL data declaration, including comments and any other documentation that would help him/her understand the business role played by each field in the declaration.

The language metamodel is also to support data driven impact analysis for application productivity and quality assurance. (But, it is not the intention of the CAM to support reproduction of copybooks.)

The language metamodels describing connector data are listed as follows:

C
C++
COBOL
PL/I 2. a. iv. Type Descriptor Metamodel

The Type Descriptor metamodel is language neutral and defines the physical realization, storage mapping and the constraints on the realization such as justification. This metamodel provides physical representation of individual fields of a given data structure. The type descriptor metamodel is to support data transformation in an enterprise application integration environment to provide data types mapping between mix languages. It also facilitates data translations from one language and platform domain into another. This metamodel will be used as a recipe for runtime data transformation (or marshaling) with language specific metamodel for overall data structures and fields names.

3. An Example of Common Connector Metamodel

IMS OTMA (Open Transaction Manager Access) is a transaction-based, connectionless client/server protocol within an OS/390 sysplex environment. An IMS OTMA transaction message consists of an OTMA prefix, plus message segments for input and output requests. Both input and output message segments contain llzz (i.e. length of the segment and reserved field), and application data. Only the very first input message segment will contain transaction code in front of the application data. IMS transaction application programs can be written in a variety of languages, e.g. COBOL, PL/I, C, and Java, etc. Therefore, the application data can be in any one of these languages.

As shown in FIG. 4, an IMS OTMA connector metamodel 401 is composed of an invocation metamodel 403 and an IMS transaction message metamodel 405, as well as a COBOL metamodel 407 and a C metamodel 409. As depicted in FIG. 4, the invocation metamodel 401 is the OTMA prefix, and the IMS transaction message metamodel 405 is the application-domain interface metamodel for the IMS application system which uses language metamodels. Metamodels for COBOL 407 and C 409 are shown.

4. Type Descriptor Metamodel

The type descriptor metamodel presents a language and platform independent way of describing implementation types, including arrays and structured types. This information is needed for marshaling and for connectors, which have to transform data from one language and platform domain into another. Inspections of the type model for different languages can determine the conformance possibilities for the language types. For example, a long type in Java is often identical to a binary type (computational-5) in COBOL, and if so, the types may be inter-converted without side effect. On the other hand, an alphanumeric type in COBOL is fixed in size and if mapped to a Java type, loses this property. When converted back from Java to COBOL, the COBOL truncation rules may not apply, resulting in computation anomalies. In addition, tools that mix languages in a server environment (e.g., Java and COBOL in CICS and IMS) should find it useful as a way to determine how faithfully one language can represent the types of another.

Therefore, an instance of the type descriptor metamodel describes the physical representation of a specific data type for a particular platform and compiler.

4. a. TDLang Metamodel

The TDLang metamodel serves as base classes to CAM language metamodels by providing a layer of abstraction between the Type Descriptor metamodel and any CAM language metamodel. All TDLang classes are abstract and common to all the CAM language metamodels. All associations between TDLang classes are marked as "volatile," "transient," or "derived" to reflect that the association is derived from the language metamodel. The TDLang model does not provide any function on its own, but it is the type target for the association from the Type Descriptor metamodel to the language metamodels.

FIG. 9 illustrates the structure of the TDLang Metamodel, with the TDLangClassifier 501, the TDLangComposedType 503 and the TDLangElement 505. With the TDLang base classes, the Type Descriptor metamodel can be used as a recipe for runtime data transformation (or marshaling) with the language-specific metamodel for overall data structures and field names, without duplicating the aggregation associations present in the language model.

4. b. Type Descriptor Metamodel

This metamodel is a MOF Class instance at the M2 level. FIG. 10 shows the relationships within the type descriptor Metamodel, including the PlatformCompilerType 601, the InstanceTDBase 603, the ArrayTD 605, the AggregateInstanceTD 607, the Simple InstanceTD 609, and the InstanceType 611. The InstanceType 611 comprises definitions of the StringTD 613, the AddressTD 615, the NumberTD 617, and the FloatTD 619. FIG. 1 I illustrates a higher level view of the TDLanguageElement and the PlatformCompilerType 601. FIG. 12 illustrates enumerations of signcoding 801, lengthEncoding 803, floatType 805, accessor 807, packedDecimalSign 809, and bitModePad 811.

4. c. Type Descriptor and Language Models

The Type Descriptor model is attached to the CAM Language model by a navigable association between TDLangElement and InstanceTDBase. TDLangElement is the base language model type used to represent a declared data item, i.e., an instance of a type. InstanceTDBase is the base Type Descriptor model type used to represent the implementation-specific instance of this same declared data item. InstanceTDBase is abstract; only one of its subtypes may be instantiated.

It is possible that a data item declared in a programming language may have different implementations. These differences are induced by hardware platform, system platform, and compiler differences. This possibility is modeled by the PlatformCompilerType model type. The association between TDLangElement and PlatformCompilerType is many to one, and the association between PlatformCompilerType and InstanceTDBase is one to one. To navigate from the language model, it is necessary to know what PlatformCompilerType is to be assumed. It is possible that an implementation, upon importing a model instance, will wish to remove from the model the PlatformCompilerType instances that are not of interest.

The association between TDLangElement and InstanceTDBase is modeled in this manner to allow for extending the model to include an association between PlatformCompilerType and a new type that more fully describes the hardware platform, the system platform, and the compiler.

Data element instances may be defined as repeating groups or arrays. This is modeled as a one to many association between InstanceTDBase and the ArrayTD model type. There would be one ArrayTD instance in this association for each dimension, subscript, or independent index of the data element. These instances hold information about the bounds and accessing computations.

The association is ordered in the same order as the corresponding association in the language model, and reflects the syntactic ordering of the indices as defined by the programming language. The rationale for this choice is the resulting equivalence of navigation and processing algorithms between the language model and the Type Descriptor model. Another choice, perhaps more advantageous to marshaling engines, would be to have the ordering of the indices from the smallest stride to the largest. This allows a marshaling engine to process the array in its natural storage order, assuming it is laid out in the usual contiguous fashion. A marshaling engine can compute this order by re-sorting the association targets according to the stride formulas if desired.

Array information may be a complex property of the data element or of its type, and various languages and programming practices seem to fall on either side. The typedef facility of C and C++ allows the definition of some array types from typedefs, but only where the array definitions are applied to the topmost elements of typedef aggregates. For example, consider the following typedef:

```
typedef struct {
   int A;
   struct {
     int C;
     char D;
     struct {
       int F;
       int G;
     } E;
   } B;
} X;
```

This typedef can be used to create a new typedef for a fixed size array, e.g.

```
typedef X Q[10];
```

But it is not possible to create a new typedef from X that makes any of the subcomponents of X, e.g., D or E, into an array. This example and many others point out the unclear status of array definitions in typed languages. An InstanceTDBase type has two concrete subtypes, SimpleInstanceTD and AggregateInstanceTD. SimpleInstanceTD models data elements without subcomponents, while AggregateInstanceTD models data elements with subcomponents. To find the subcomponents of an AggregateInstanceTD, one must navigate back to the corresponding data element declaration in the CAM language model. There, the association between an aggregate type and its subcomponents may be navigated, leading to a set of subcomponent data elements, each of which has one or more corresponding instances in the Type Descriptor model. This introduces some model navigation complexity, but avoids duplicating the aggregation hierarchy in both the language and the Type Descriptor models. The additional processing complexity of traversal is not great, and considerable simplification is obtained in algorithms that would modify the model to add, delete or rearrange subcomponents in an aggregation.

A SimpleInstanceTD model type is also associated one to one with a BaseTD model type. The BaseTD model type is specialized to hold implementation information that is common for all data elements of the same language type. The information that describes a 32-bit signed binary integer on a specific hardware/software platform is thus instantiated only once in a given model instantiation, no matter how many data elements may be declared with this type.

One may contemplate an association between TDLangClassifier and BaseTD matching the association between TDLangElement and InstanceTDBase. However, this is problematic in that constructions that the language regards as simple types (e.g., strings) may not map directly to simple hardware/software types. Rather than introduce more mechanisms into the Type Descriptor model to describe string implementations, a specialization of BaseTD is utilized which describes the common string implementations. Various attributes in the TypeDescriptor model are suffixed with the string "formula." These attributes contain information that may in some cases be impossible to compute without access to data created only at run-time. An example is the current upper bound of a variable-sized array or the offset to an element that follows another element whose size is only known at run-time. Such information could be included as values in a model instance, but this would require a model instance for each run-time instance, and would mean that the model could only be constructed at run-time, requiring the model definition to include factories and other apparatus to create model instances at run-time. A model that can be constructed from platform and compiler knowledge is much more useful, and the formulas provide a way to define concrete values when the run-time information is available. These formulas may be interpreted by marshaling engines, or they may be used to generate marshaling code, which is loaded and executed by the marshaling engine on demand.

4. d. Formulas

As used in connection with formulas, "field" refers to a component of a language data structure described by the Type Descriptor model, while "attribute" denotes part of the model, and has a value representing a "property" of the field. Thus the value of a field means a run-time value in a particular instance of a language data structure, whereas the value of an attribute is part of the description of a field in a language data structure, applies to all instances of the data structure, and is determined when the data structure is modeled.

For most attributes in an instance of the Type Descriptor model, the value of the attribute is known when the instance is built, because the properties of the fields being described, such as size and offset within the data structure, are invariant. But if a field in a data structure is defined using the COBOL OCCURS DEPENDING ON construct or the PL/I Refer construct, then some properties of the field (and properties of other fields that depend on that field's value) cannot be determined when the model instance is built.

Properties that can be defined using these language constructs are string lengths and array bounds. A property that could indirectly depend on these language constructs is the offset of a field within a structure, if the field follows a variable-size field.

In order to handle these language constructs, properties of a field that could depend on these constructs (and thus the values of the corresponding attributes), are defined with strings that specify a formula that can be evaluated when the model is used.

However, if a property of a field is known when the model instance is built, then the attribute formula simply specifies an integer value. For example, if a string has length 17, then the formula for its length is "17".

The formulas mentioned above are limited to the following:

Unsigned integers
The following arithmetic integer functions

| | | |
|---|---|---|
| neg(x): = −x | //prefix negate | |
| add(x,y): = x + y | //infix add | |
| sub(x,y): = x − y | //infix subtract | |
| mpy(x,y): = x*y | //infix multiply | |
| div(x,y): = x/y | //infix divide | |
| max(x,y): = max(x,y) | | |
| min(x,y): = min(x,y) | | |
| mod(x,y): = x mod y | | |

The mod function is defined as mod(x,y)=r where r is the smallest non-negative integer such that x−r is evenly divisible by y. So mod(7,4) is 3, but mod(−7,4) is 1. If y is a power of 2, then mod(x,y) is equal to the bitwise-and of x and y−1.

The val function

The val function returns the value of a field described by the model. The val function takes one or more arguments, and the first argument refers to the level-1 data structure containing the field, and must be either:

the name of a level-1 data structure in the language model
the integer 1, indicating the level-1 parent of the variable-size field. In this case, the variable-size field and the field that specifies its size are in the same data structure, and so have a common level-1 parent.

The subsequent arguments are integers that the specify the ordinal number within its substructure of the (sub)field that should be dereferenced.

By default, COBOL data fields within a structure are not aligned on type-specific boundaries in storage. For example, the "natural" alignment for a four-byte integer is a full-word storage boundary. Such alignment can be specified by using the SYNCHRONIZED clause on the declaration. Otherwise, data fields start immediately after the end of the preceding field in the structure. Since COBOL does not have bit data, fields always start on a whole byte boundary.

For PL/I, the situation is more complicated. Alignment is controlled by the Aligned and Unaligned declaration attributes. By contrast with COBOL, most types of data, notably binary or floating-point numbers, are aligned on their natural boundaries by default.

4. d. i) Formula examples 4. d. i) a) COBOL

The examples use the proposed inline comment indicator "*>" from the draft standard. It is not yet legal COBOL usage.

1. Consider the following data description:

| *>Field | Offset |
|---|---|
| 01 Used-Car. | *> "0" |
|   02 Summary. | *> "0" |
|     03 Make pic x(36). | *> "0" |
|     03 Model pic x(44). | *> "36" |
|     03 VIN pic x(13). | *> "80" |
|     03 Color pic x(10). | *> "93" |
|       88 Red value 'Red'. | |
|       88 White value 'White'. | |
|       88 Blue value 'Blue'. | |
|   02 History. | *> "103" |
|     03 Mileage pic 9(6). | *> "103" |
|     03 NumClaims binary pic 9. | *> "109" |
|     03 InsCode pic x. | *> "111" |
|     03 Claims. | *> "112" |
|       04 Claim occurs 1 to 9 times | |
|         depending on NumClaims. | *> stride(1) = "154" |
|         05 ClaimNo pic x(12). | |
|         05 ClaimAmt binary pic 9(5). | |
|         05 Insurer pic x(38). | |
|         05 Details pic x(100). | |
|   02 Price comp pic 9(5)v99. | *> "add(112,mpy(val(1,2,2),154))" |

The offset of Model is straightforward, and is given by the formula "36". So is that of claims, which is "112".

But because the array claim can occur a variable number of times, the structure History is a variable-size field. Thus the offset of Price, which immediately follows claims, requires a more complicated formula, involving the array stride (the distance between successive elements along a specific dimension). For claim, there is only one dimension, and the formula for its stride is "154". Thus the formula for the offset of Price is:

"add(112,mpy(val(1,2,2),154))"

The first argument of the val function is 1, meaning that the field containing the value at run-time, Numclaims, is in the same level-1 structure, Used-Car, as the field, Price, whose offset is specified by the formula. The other two arguments are 2 and 2. The first 2 refers to the second immediate subcomponent, History, of Used-Car. The second 2 means that the field to be dereferenced is the second component of History, that is, Numclaims.

If the OCCURS DEPENDING ON object were in a separate structure, the third subcomponent of level-1 structure Car-Data, say, then the val function would be "val(Car-Data, 3)".

COBOL structure mapping is top-down, although the direction doesn't make any difference unless the SYNCHRONIZED clause is specified on the data declaration. Specifying SYNCHRONIZED forces alignment of individual fields on their natural boundaries, and thus introduces "gaps" into the structure mapping. Consider the following data structure, which is identical to the previous example, except for the SYNCHRONIZED clause:

| *> Field | Offset |
|---|---|
| 01 Used-Car SYNCHRONIZED | *> "0" |
| 02 Summary. | *> "0" |
| 03 Make pic x(36). | *> "0" |
| 03 Model pic x(44). | *> "36" |
| 03 VIN pic x(13). | *> "80" |
| 03 Color pic x(10). | *> "93" |
| 88 Red value 'Red'. | |
| 88 White value 'White'. | |
| 88 Blue value 'Blue'. | |
| 02 History. | *> "103" |
| 03 Mileage pic 9(6). | *> "103" |
| 03 NumClaims binary pic 9. | *> "110" |
| 03 InsCode pic x. | *> "112" |
| 03 Claims. | > "113" |
| 04 Claim occurs 1 to 9 times depending on NumClaims. | *> stride(1) = "160" |
| 05 ClaimNo pic x(12). | |
| 05 ClaimAmt binary pic 9(5). | |
| 05 Insurer pic x(38). | |
| 05 Details pic x(100). | |
| 02 Price comp pic 9(5)v99. | *> |
| "add(add(113, mpy(val(1,2,2), 160)), 3)" | |

To position the binary fields on their appropriate half-word or full-word storage boundaries, COBOL introduces padding, known as "slack bytes", into the structure. Working top-down, this padding is introduced immediately before the field needing alignment. So there is one byte of padding between Mileage and Numclaims.

For an array, such as claim, COBOL not only adjusts the padding within an element, but also the alignment of each element of the array. In the example, the first occurrence of claim starts one byte past a full-word boundary. Because the field Claim No is an exact number of full-words long, it ends one byte past a full-word boundary, so COBOL inserts three bytes of padding immediately before the binary full-word integer claimAmt. And to align subsequent occurrences, so that they too start one byte past a full-word boundary like the first, and can thus have an identical configuration, COBOL adds three bytes of padding at the end of each occurrence.

Finally, after padding, each occurrence of claim (starts and) ends one byte past a full-word boundary, so COBOL puts three bytes of padding before the binary field Price. As a result of all these extra bytes, the formula for the offset of Price has changed considerably from the unaligned example, and is now:

"add(add(113,mpy(val)1,2,2),160)),3)"

There are several differences between the OCCURS DEPENDING ON construct and PL/I's Refer option. Storage for COBOL structures is always allocated at the maximum size, whereas PL/I structures are allocated at the actual size specified by the Refer option. It is legal and usual to change the number of occurrences in a particular instance of a variable-size COBOL array, and this has the effect of changing the location and offset of any fields that follow the array. For PL/I, the value of the Refer object of a particular instance of a structure is intended to be fixed during execution Thus aligned objects following a variable-size field are always correctly aligned for each instance of the structure, because the amount of padding is computed uniquely for each instance, as determined by the Refer option. By contrast, the amount of padding for any aligned fields following a variable-size COBOL array is computed assuming the maximum array size, and is fixed at compile time. If the array is smaller than its maximum size, then the alignment will typically be incorrect. For instance in this example:

1 a sync.
2 b binary pic 9.
2 c pic x occurs 1 to 5 times depending on b.
2 d binary pic 9(9).

COBOL inserts one byte between c and d. The alignment of d is therefore correct for only two values of b, the maximum, 5, and 2.

As noted above, the formulas describe not only offsets of fields within a structure, but also properties of arrays, such as bounds and strides. COBOL does not have true multi-dimensional arrays, although element references do use multiple subscripts. Instead, COBOL has arrays of arrays, as in the following simple example:

| | |
|---|---|
| 1 a. | *< offset = "0" |
| 2 d1 occurs 5 times. | *< offset = "0" |
| | *< lbound(1) = "1" |
| | *< hbound(1) = "5" |
| | *< stride(1) = "168" |
| 3 d2 occurs 6 times. | *< offset = "0" |
| | *< lbound(2) = "1" |
| | *< hbound(2) = "6" |
| | *< stride(2) = "28" |
| 4 el binary pic 9(9) occurs 7 times. | *< offset = "0" |
| | *< lbound(3) = "1" |
| | *< hbound(3) = "7" |
| | *< stride(3) = "4" |

The program can refer to slices of the array by subscripting the higher-level container fields, for example, d1(2) or d2(3, 4), but the normal kind of reference is to the low-level elements using the full sequence of subscripts, for instance, el(4, 5, 6). To locate element el(m, n, o) using these stride formulas, one would take the address of a and add to it (m−1)*168+(n−1)*28+(o−1)*4. For COBOL, the lower bound of an array subscript is always 1. That is, the first element is always element(1), and vice versa.

Needless to say, any dimension of the array can have the OCCURS DEPENDING ON clause, and the array can be followed by other fields, which complicates the formulas a lot. Consider the example:

```
1 a.
  2 x1 binary pic 9.      * < offset = "0"
  2 x2 binary pic 9.      * < offset = "2"
  2 x3 binary pic 9.      * < offset = "4"
  2 d1 occurs 1 to 5 times    * < offset = "6"
    depending on x1.     * < lbound(1) = "1"
                         * < hbound(1) = "val(1,1)"
                         * < stride(1) = "mpy(val( 1,2),mpy(val(1,3),4))"
  3 d2 occurs 1 to 6 times    * < offset = "6"
    depending on x2.     * < lbound(2) = "1"
                         * < hbound(2) = "val(1,2)"
                         * < stride(2) = "mpy(val(1,3),4)"
  4 el binary pic 9(9)   * < offset = "6"
    occurs 1 to 7 times  * < lbound(3) = "1"
    depending on x3.     * < hbound(3) = "val(1,3)"
                         * < stride(3) = "4"
  2 b binary pic 9(5).   * < offset = "see below!"
```

Computing the address of a particular element still involves the stride formulas, but these are no longer simple integers. The address of element el(m, n, o) in the above example is given by taking the address of a and adding to it:

(m−1)*stride(1)+(n−1)*stride(2)+(o−1)*stride(3), i.e., (m−1)*4*val(1,3)*val(1,2)+(n−1)*4*val(1,3)+(o−1)*4.

Similarly, these stride formulas are used in the formula for the offset of b:

"add(6,mpy(val(1,1),mpy(val(1,2), mpy(4,val(1,3)))))"

4. d. i). b). PL/I

1. Given the following structure

```
dcl              /* offset             */
  1 c unaligned     /* "0"              */
   ,2 c1         /* "0"              */
     ,3 c2 fixed bin(31)   /* "0"      */
     ,3 c3 fixed bin(31)   /* "4"      */
   ,2 c4         /* "8"              */
     ,3 c5 fixed bin(31)   /* "0"      */
     ,3 c6 fixed bin(31)   /* "4"      */
     ,3 c7 fixed bin(31)   /* "8"      */
   ,2 c8 fixed bin(31)    /* "20"      */
   ,2 c9 char( *refer(c7))  /* "24"    */
   ,2 c10 char(6)    /* "add(24,val(1,2,3))"   */
   ,2 c11 char(4)    /* "add(add(24,val(1,2,3)),6)"  */
;
```

The offset of c3 would be given by the simple formula "4", but the offset of c10 would be given by the formula:

"add(24,val(1,2,3))"

The first argument in the above val function is 1, which indicates the current structure, c. The subsequent arguments are 2 and 3, indicating that the third element, c7, of the second level-2 field, c4, is the field to be dereferenced.

The offset of c11 is equal to the offset of c10 plus the length of c10 and would be given by the following formula:

"add(add(24,val(1,2,3)),6)"

PL/I structure mapping is not top-down, and this can be illustrated by examining the mapping of the following structure:

```
dcl               /* offset           */
  1 a based,         /* "0"           */
    2 b,             /* "0"           */
      3 b1 fixed bin(15),    /* "0"       */
      3 b2 fixed bin(15),    /* "2"       */
      3 b3 fixed bin(31),    /* "4"       */
    2 c,          /*  "add(8,mod(neg(val(1,1,1)),4))"  */
      3 c1 char( n refer(b1)),   /* "0"     */
      3 c2 fixed bin(31);   /* "val(1,1,1)"    */
```

The value of b1 is given by val(1, 1, 1), and in order to put c2 on a 4-byte boundary, PL/I puts any needed padding before c (yes, not between c1 and c2), and hence the offset of c would be given by the following formula:

"add(8,mod(neg(val(1, 1, 1)),4))"

So if b1 contains the value 3, then this formula becomes add(8,mod(neg(3),4)), which evaluates to 9. I.e., there is one byte of padding between the structure b and the structure c.

The model also uses these formulas to specify the bounds and strides in an array, where the stride is defined as the distance between two successive elements in an array.

For example, in the following structure, the second dimension of a.e has a stride specified by the formula "4", and the first dimension by the formula "20":

```
dcl
  1 a,              /* offset = "0"     */
    2 b(4) fixed bin(31),     /* offset = "0"    */
                              /* lbound(1) = "1"  */
                              /* hbound(1) = "4"  */
                              /* stride(1) = "4"  */
    2 c(4) fixed bin(31),     /* offset = "16"   */
                              /* lbound(1) = "1"  */
                              /* hbound(1) = "4"  */
                              /* stride(1) = "4"  */
    2 d(4) char(7) varying,   /* offset = "32"   */
                              /* lbound(1) = "1"  */
                              /* hbound(1) = "4"  */
                              /* stride(1) = "9"  */
    2 e(4,5) fixed bin(31);   /* offset = "68"   */
                              /* lbound(1) = "1"  */
                              /* hbound(1) = "4"  */
                              /* stride(1) = "20" */
                              /* lbound(2) = "1"  */
                              /* hbound(2) = "5"  */
                              /* stride(1) = "4"  */
```

This means that to locate the element a.e(m,n), one would take the address of a.e and add to it (m−1)*20+(n−1)*4.

If the example were changed slightly to:

```
dcl
  1 a(4),                 /* offset = "0"    */
                          /* lbound(1) = "1"  */
                          /* hbound(1) = "4"  */
                          /* stride(1) = "40" */
    2 b fixed bin(31),    /* offset = "0"   */
    2 c fixed bin(31),    /* offset = "4"   */
    2 d char(7) varying,  /* offset = "8"   */
    2 e(5) fixed bin(31); /* offset = "20"  */
                          /* lbound(1) = "1"  */
                          /* hbound(1) = "5"  */
                          /* stride(1) = "4"  */
``` then there is padding between d and e, but the user of the type descriptor can be blissfully unaware and simply use the stride and offset formulas to locate any given array element.

The stride for a is "40", the stride for e is "4", and the offset for e is "20". This means that to locate the element a(m).e(n), one would take the address of a and add to it (m−1)*40+20+(n−1)*4.

Finally, if the example were changed again to:

```
dcl
  1 a(4),              /* offset = "0"     */
                       /* lbound(1) = "1"  */
                       /* hbound(1) = "4"  */
                       /* stride(1) = "40" */
    2 b fixed bin(31), /* offset = "0"     */
    2 c(8) bit(4),     /* offset = "4"     */
                       /* lbound(1) = "1"  */
                       /* hbound(1) = "8"  */
                       /* stride(1) = "4"  */
    2 d char(7) varying, /* offset = "8"   */
    2 e(5) fixed bin(31); /* offset = "20" */
                       /* lbound(1) = "1"  */
                       /* hbound(1) = "5"  */
                       /* stride(1) = "4"  */
``` then the computations for a.e are the same as above, but the computations for a.c become interesting.

The stride for a is still "40", the stride for c is "4" (but this "4" is a count of bits, not bytes), and the byte offset for c is "4". To locate the element a(m).c(n), one needs both a byte address and a bit offset. For the byte address, one would take the address of a and add to it (m−1)*40+4+((n−1)*4)/8. The bit offset of a(m).c(n) would be given by mod((n−1)*4,8).

4. e. Type Descriptor Specification 4. e. i. TDLang Metamodel Specification

TDLang Classes—General Overview. TDLang classes serve as a layer of abstraction between any CAM language model and the TypeDescriptor model.

Since any CAM language model can plug into the TDLang model, the Type Descriptor model only needs to understand how to interface with TDLang in order to access any CAM language model.

The TDLang model does not provide any function on its own and therefore only makes sense when it is attached to a language model. TDLang is common to all the CAM language models and is the type target for the association from TypeDescriptors to the language models.

Note all TDLang classes are abstract and they serve as the base classes to the language metamodels.

TDLangClassifier. TDLangClassifier is the parent class of all language-specific Classifier classes and TDLangComposedType. The TDLangSharedType association is derived from the language's "+sharedType" association from Element to Classifer class.

The association should be marked "volatile," "transient," or "derived" to reflect that the association is derived from the language model. The TDLangClassifier is derived from TDLangModelElement TDLangElement. TDLangElement is the parent class of all language-specific Element classes. The tdLangTypedElement association is derived from the language's "+typedElement" association from Classifer to Element class. The association should be marked "volatile", "transient", and "derived" to reflect that the association is derived from the language model.

The tdLangElement association is derived from the language's "+element" association from Classifer to Element class. The association should be marked "volatile," "transient," or "derived" to reflect that the association is derived from the language model.

TDLangComposedType. The TDLangComposedType is the parent class of all language-specific ComposedTypes. The TDLangGroup association is derived from the language's "+group" association from Element to ComposedType class. The association should be marked "volatile," "transient," or "derived" to reflect that the association is derived from the language model. The TDLangComposedType is derived from TDLangClassifier.

4. e. ii. Type Descriptor Metamodel Specification

The Type Descriptor package defines a model for describing the physical implementation of a data item type. This model is language neutral and can be used to describe the types of many languages. Inspections of the type model for different languages can determine the conformance possibilities for the language types. For example, a long type in Java is often identical to a binary type in COBOL, and if so, the types may be interconverted without side effect. On the other hand, an alphanumeric type in COBOL is fixed in size and if mapped to a Java type, will lose this property. When converted back from Java to COBOL, the COBOL truncation rules may not apply, resulting in computation anomalies.

AggregateInstanceTD. For each instance of an aggregate, there is an instance of this class. To find the children of this aggregate, one must navigate the associations back to language Classifier then downcast to language Composed Type and follow the association to its children.

Derived from InstanceTDBase
Public Attributes:
  union: boolean=false
  Distinguishes whether the aggregation is inclusive (e.g. a structure) or exclusive (e.g. a union).
  If union=true, storage might be overlaid and as a result the interpretation of the content may be uncertain.
ArrayTD. ArrayTD holds information for array types.
Public Attributes:
  arraryAlign: int
  Alignment requirements in addressible units for each element in the array.
strideFormula: string
  A formula that can be used to calculate the displacement address of any element in the array, given an index.
strideInBit: boolean
  True indicates strideFormula value in bits
  False indicates strideFormula value in bytes
upperBoundFormula: String
  Declared as a String for instances when this value is referenced by a variable.
  This attribute supplies the upperbound value of a variable size array
  Upperbound is required when traversing back up the entire structure.
lowerBoundFormula: String
  Declared as a String for instances when this value is referenced by a variable.
  This attribute supplies the lowerbound value of a variable size array.
InstanceTDBase. InstanceTD has instances for each declared variable and structure element.

To find the parent of any instance (if it has one) one must navigate the associations back to TDLangElement, follow the association to TDLangClassifier to locate the parent, then follow the associations back into the TypeDescriptor model.

Public Attributes:
offsetFormula: string
A formula for calculating the offset to the start of this instance.
This attribute is String because this field may not always be an integer value. For example, (value(n)+4) could be a possible value.
NOTE: The offset value is calculated from the top-most parent. (e.g., for a binary tree A-->B, A-->C, B-->D, B-->E. The offset to D is calculated from A to D, not B to D)
contentSizeFormula: string
Formula for calculating the current size of the contents
allocSizeFormula: string
Formula for calculating the allocated size of the instance
formulaInBit: boolean
True indicates offsetFormula, contentSizeFormula, and allocSizeFormula values are in bits
False indicates offsetFormula, contentSizeFormula, and allocSizeFormula values are in bytes
defaultEncoding: String
Physical encoding—how many bits used to encode code points, how are the code points mapped onto bit patterns
Contains info on how string content is encoded: EBCDIC, ASCII, UNICODE, UTF-8, UTF-16, codepage numbers, etc . . .
accessor: enumeration
Specifies access-rights for this element.
defaultBigEndian: boolean
True if this element is Big Endian format.
floatType: enumeration
Specifies this element's float type.
PlatformCompilerType. A specific data type for a particular platform and compiler. NOTE: There needs to be some way to identify the platform and compiler. This class can be specializedor have an attribute, or be simplified by putting an attribute on InstanceTDBase.
Public Attributes:
　platformCompilerType: String
　This attribute specifies the type of compiler used to create the data in the language model. Usage of this string is as follows:
　"Vendor name, language, OS, hardware platform" (e.g., "IBM, COBOL, OS390, 390" or "IBM, PLI, WinNT, Intel")
　SimpleInstanceTD. An instance of a Simple type in the language model.
Derived from InstanceTDBase
NumberTD
　All numbers representations.
　Currently includes Integers and Packed Decimals
　Note required fields for these types of Numbers:
　*Integer*
　Base=2
　MSBU=0 or 1
　Signed/Unsigned
　Size (in bytes)=1,2,4,8 (16)
　*Packed Decimal*
　Base=10
　MSBU=0
　Signed
　Width=1-63
　*Float*
　Base=2(IEEE), 16(Hex)
　MSBU=0 or 1
　Signed
　Size (in bytes)=4,8,16
　Encoding Details . . .
　Derived from BaseTD
　Public Attributes:
　base: int
　The base representation of this number. 2=binary, 10=decimal, 16=hex, . . .
　baseWidth: int
　Number of bits used to represent base:
　e.g. binary=1, decimal=8, packed=4
　baseInAddr: int
　Number of baseWidth units in addressable storage units—e.g. decimal=1, packed=2, binary=8 where the addressable unit is a byte. If the addressable unit was a 32 bit word, decimal would be 4, packed would be 8, and binary would be 32.
　baseUnits: int
　Number of base units in the number. This times the base width must be less than or equal to the width times the addrUnit.
　For example, a 24 bit address right aligned in a 32 bit word would have base=1, basewidth=24, baseInAddr=8, width=4.
　signcoding: enumeration
　A set of enumerations—2's complement, 1's complement, and sign magnitude for binary; zone signs for decimal, packed signs for packed decimal, and unsigned binary, unsigned decimal.
　checkValidity: boolean
　True if language model is required for picture string support packedDecimalSign: enumeration
　Used to determine the code point of the sign in COBOL decimal numbers, where the sign is combined with the leading or trailing numeric digit.
FloatTD
　Floating points
　Derived from BaseTD
　Public Attributes:
　floatType: enumeration
　Specifies this element's float type.
1 StringTD
　Alphanumeric type
　Derived from BaseTD
　Public Attributes:
　encoding: String
　Physical encoding—how many bits used to encode code points, how are the code points mapped onto bit patterns
　Contains info on how string content is encoded: EBCDIC, ASCII, UNICODE, UTF-8, UTF-16, codepage numbers, etc . . .
　lengthencoding: enumeration
　Possible values for lengthEncoding:
　Fixed length (where total length equals declared string length)
　Length prefixed (where total length equals declared string length plus length of header bytes; usually 1, 2, or 4 bytes)
　Null terminated (known as varyingZ strings in PL/I) (where a null symbol is added to the end of string; so the maximum length could be up to declared string length plus one byte to represent null character)
　maxLengthFormula: String
　Formula specifying the maximum length of this string.
　checkvalidity: boolean
　True if language model is required for picture string support
　textType: String=Implicit
　Value is 'Implicit' or 'Visual' orientation: StringTD=LTR
  Value is 'LTR', 'RTL', 'Contextual LTR', or 'Contextual RTL'
  where LTR=Left to Right
  and RTL=Right to Left
Symmetric: boolean=true
  True if symmetric swapping is allowed
numeralShapes: String=Nominal
  Value is 'Nominal', 'National', or 'Contextual'
textShape: String=Nominal
  Value is 'Nominal', 'Shaped', 'Initial', 'Middle', 'Final', or 'Isolated'
AddressTD
Type to represent pointers/addresses
Rationale for this class:
Addresses should be considered separate from NumberTD class because some languages on certain machines (e.g., IBM 400) represent addresses with additional information, such as permission type (which is not represented in NumberTD class)
Derived from BaseTD
Public Attributes:
permission: String
Specifies the permission for this address. Used primarily for AS/400 systems.
bitModePad: enumeration
Specifies the number of bits for this address. Used to calculate padding.
BaseTD
  The base class of typeDescriptor.
  The BaseTD model type is specialized to hold implementation information which is common for all data elements of the same language type. The information which describes a 32 bit signed binary integer on a specific hardware/software platform is thus instantiated only once in a given model instantiation, no matter how many data elements may be declared with this type.
  Public Attributes:
  addrUnit: enumeration
  Number of bits in storage addressable unit
  bit/byte/word/dword
  width: int
  Number of addressable storage units in the described type. This can be 1, 8, 16, 32 bits.
  alignment: int
  Required alignment of type in address space—e.g. word aligned 32 bit integer would have alignment of 4
  nickname: int
  Name of the base element. This should uniquely identify an instance of a simple type to allow logic based on name rather than logic based on combinations of attributes. E.g. "S390Binary31_0" for a 32 bit S/390 unscaled binary integer
  bigEndian: boolean
  True if this element is Big Endian format.
Stereotypes
bitModePad
  Public Attributes:
  24 bit:
  31 bit:
  32 bit:
  64 bit:
  128 bit:
signCoding
  Note that this model does not include the following COBOL usages:
  1 POINTER
  PROCEDURE-POINTER
  OBJECT REFERENCE
  Public Attributes:
  twosComplement:
  onesComplement:
  signMagnitude:
  zoneSigns:
  packedSigns:
  unsignedBinary:
  unsignedDecimal:
lengthEncoding
  Public Attributes:
  fixedLength:
  lengthPrefixed:
  nullTerminated:
floatType
  Public Attributes:
  Unspecified:
  IEEEextendedIntel:
  For IEEE extended floats running on Intel Platform
  IEEEextendedAIX:
  For IEEE extended floats running on AIX Platform
  IEEEextendedOS390:
  For IEEE extended floats running on OS/390 Platform
  IEEEextendedAS400:
  For IEEE extended floats running on AS400 Platform
  IEEEnonextended:
  For IEEE non-extended floats
  IBM390Hex:
  For Hexadecimal floats running on IBM OS/390
  IBM400Hex:
  For Hexadecimal floats running on IBM AS400
accessor
  Public Attributes:
  ReadOnly:
  WriteOnly:
  ReadWrite:
  NoAccess:
packedDecimalSign
  Public Attributes:
  MVS:
  MVSCustom:
  NT/OS2/AIX:

5. CICS BMS (Basic Mapping Support) Metamodel

FIG. 9 illustrates a BMS language metamodel, which is usable by application programs to define data structures which represent connector interfaces. FIG. 10 illustrates attributes, fields, attribute values, maps, and attributes of the BMS Language Model.
  BMSFieldAttributes
    Private Attributes:
    justify: justifyValues
    attrb: attrbValues
    color: colorValue="DEFAULT"
    hiLight: hiLightValue="OFF"
    validn: validnValues
    outline: outlineValues
    sosi: yesno="NO"
    transp: yesno="YES"
    caSe: caseValue
    ps: psValue="BASE"
  BMSMap
    Implemented by DFHMDI macro
      MAPNAME is the name of the map and consists of 1-7 characters.

COLUMN specifies the column in a line at which the map is to be placed, that is, it establishes the left or right map margin.

JUSTIFY controls whether map and page margin selection and column counting are to be from the left or right side of the page. The columns between the specified map margin and the page margin are not available for subsequent use on the page for any lines included in the map.

NUMBER is the column from the left or right page margin where the left or right map margin is to be established.

NEXT indicates that the left or right map margin is to be placed in the next available column from the left or right on the current line.

SAME indicates that the left or right map margin is to be established in the same column as the last non-header or nontrailer map used that specified COLUMN=number and the same JUSTIFY operands as this macro. For input operations, the map is positioned at the extreme left-hand or right-hand side, depending on whether JUSTIFY=LEFT or JUSTIFY=RIGHT has been specified.

LINE specifies the starting line on a page in which data for a map is to be formatted.

NUMBER is a value in the range 1-240, specifying a starting line number. A request to map, on a line and column, data that has been formatted in response to a preceding BMS command, causes the current page to be treated as though complete. The new data is formatted at the requested line and column on a new page.

NEXT specifies that formatting of data is to begin on the next available completely empty line. If LINE=NEXT is specified in the DFHMDI macro, it is ignored for input operations and LINE=1 is assumed.

SAME specifies that formatting of data is to begin on the same line as that used for a preceding BMS command. If COLUMN=NEXT is specified, it is ignored for input operations and COLUMN=1 is assumed. If the data does not fit on the same line, it is placed on the next available line that is completely empty.

SIZE(arg1,arg2) specifies the size of a map. Arg2=line is a value in the range 1-240, specifying the depth of a map as a number of lines. arg1 =column is a value in the range 1-240, specifying the width of a map as a number of columns.

This operand is required in the following cases:
An associated DFHMDF macro with the POS operand is used.
The map is to be referred to in a SEND MAP command with the ACCUM option.
The map is to be used when referring to input data from other than a 3270 terminal in a RECEIVE MAP command.
SOSI indicates that the field may contain a mixture of EBCDIC and DBCS data. The DBCS subfields within an EBCDIC field are delimited by SO (shift out) and SI (shift in) characters. SO and SI both occupy a single screen position (normally displayed as a blank). They can be included in any non-DBCS field on output, if they are correctly paired. The terminal user can transmit them inbound if they are already present in the field, but can add them to an EBCDIC field only if the field has the SOSI attribute.

TIOAPFX specifies whether BMS should include a filler in the symbolic description maps to allow for the unused TIOA prefix. This operand overrides the TIOAPFX operand specified for the DFHMSD macro.

YES specifies that the filler should be included in the symbolic description maps. If TIOAPFX=YES is specified, all maps within the mapset have the filler. TIOAPFX=YES should always be used for command-level application programs.

NO is the default and specifies that the filler is not to be included.

Private Attributes:
type: String
height: int
ctrl: ctrlValues
validn: validnValues
column: int
line: int
field: fieldsValue
sosi: yesno="NO"
justify: bottomValue
mapName: String
ps: psValue="BASE"

BMSMapSet
Implemented by the DFHMSD macro
Programming attributes in this class
type=DSECT|MAP|FINAL. Mandatory, this generates the two bits of a BMS entity
mode=OUT|IN|INOUT. OUT is default. INOUT says do both IN and OUT processing. With IN, I is appended to mapname, with OUT, O is appended to mapname
lang=ASM|COBOL|COBOL2|PLI|C. ASM is default.
fold=LOWER|UPPER. LOWER is default. Only applies to C.
dsect=ADS|ADSL. ADS is default. ADSL requires lang=C.
trigraph=YES only applies to lang=C.
BASE specifies that the same storage base is used for the symbolic description maps from more than one mapset. The same name is specified for each mapset that is to share the same storage base. Because all mapsets with the same base describe the same storage, data related to a previously used mapset may be overwritten when a new mapset is used. Different maps within the same mapset also overlay one another.
This operand is not valid for assembler-language programs, and cannot be used when STORAGE=AUTO has been specified.
term=type. Each terminal type is represented by a character. 3270 is default and is a blank. Added to MAPSET name, or, suffix=numchar which is also added to mapset name.
CURSLOC indicates that for all RECEIVE MAP operations using this map on 3270 terminals, BMS sets a flag in the application data structure element for the field where the cursor is located.
STORAGE
The meaning of this operand depends upon the language in which application programs are written, as follows:
For a COBOL program, STORAGE=AUTO specifies that the symbolic description maps in the mapset are to occupy separate (that is, not redefined) areas of storage. This operand is used when the symbolic description maps are copied into the working-storage section and the storage for the separate maps in the mapset is to be used concurrently.

For a C program, STORAGE=AUTO specifies that the symbolic description maps are to be defined as having the automatic storage class.

If STORAGE=AUTO is not specified, they are declared as pointers. You cannot specify both BASE=name and STORAGE=AUTO for the same mapset.

If STORAGE=AUTO is specified and TIOAPFX is not, TIOAPFX=YES is assumed.

For a PL/I program, STORAGE=AUTO specifies that the symbolic description maps are to be declared as having the AUTOMATIC storage class. If STORAGE=AUTO is not specified, they are declared as BASED. You cannot specify both BASE=name and STORAGE=AUTO for the same mapset. If STORAGE=AUTO is specified and TIOAPFX is not, TIOAPFX=YES is assumed.

For an assembler-language program, STORAGE=AUTO specifies that individual maps within a mapset are to occupy separate areas of storage instead of overlaying one another.

Private Attributes:
type: typevalue
mode: modeValue="OUT"
fold: lowerupper="LOWER"
trigraph: yesno="NO"
lang: langvalue="ASM"
storage: Boolean='0'
dsect: dsectValue="ADS"
base: String
suffix: String=" "
mapsetName: String
tioapfx: yesno="NO"
cursloc: yesno="NO"

BMSField

Implemented by the DFHMDF macro.

GRPNAME is the name used to generate symbolic storage definitions and to combine specific fields under one group name. The same group name must be specified for each field that is to belong to the group. The length of the name is up to 30 characters though you should refer to your compiler manual to make sure that there are no other restrictions on the length.

If this operand is specified, the OCCURS operand cannot be specified.

The fields in a group must follow on; there can be gaps between them, but not other fields from outside the group. A field name must be specified for every field that belongs to the group, and the POS operand must also be specified to ensure that the fields follow each other. All the DFHMDF macros defining the fields of a group must be placed together, and in the correct order (ascending numeric order of the POS value).

For example, the first 20 columns of the first six lines of a map can be defined as a group of six fields, as long as the remaining columns on the first five lines are not defined as fields.

The ATTRB operand specified on the first field of the group applies to all of the fields within the group.

LENGTH specifies the length (1-256 bytes) of the field or group of fields. This length should be the maximum length required for application program data to be entered into the field; it should not include the one-byte attribute indicator appended to the field by CICS for use in subsequent processing. The length of each individual subfield within a group must not exceed 256 bytes. LENGTH can be omitted if PICIN or PICOUT is specified, but is required otherwise. You can specify a length of zero only if you omit the label (field name) from the DFHMDF macro. That is, the field is not part of the application data structure and the application program cannot modify the attributes of the field. You can use a field with zero length to delimit an input field on a map.

The map dimensions specified in the SIZE operand of the DFHMDI macro defining a map can be smaller than the actual page size or screen size defined for the terminal.

If the LENGTH specification in a DFHMDF macro causes the map-defined boundary on the same line to be exceeded, the field on the output screen is continued by wrapping.

OCCURS specifies that the indicated number of entries for the field are to be generated in a map, and that the map definition is to be generated in such a way that the fields are addressable as entries in a matrix or an array. This permits several data fields to be addressed by the same name (subscripted) without generating a unique name for each field.

OCCURS and GRPNAME are mutually exclusive; that is, OCCURS cannot be used when fields have been defined under a group name. If this operand is omitted, a value of OCCURS=1 is assumed.

PICIN (COBOL and PL/I only) specifies a picture to be applied to an input field in an IN or INOUT map; this picture serves as an editing specification that is passed to the application program, thus permitting the user to exploit the editing capabilities of COBOL or PL/I. BMS checks that the specified characters are valid picture specifications for the language of the map.

However, the validity of the input data is not checked by BMS or the high-level language when the map is used, so any desired checking must be performed by the application program. The length of the data associated with "value" should be the same as that specified in the LENGTH operand if LENGTH is specified. If both PICIN and PICOUT are used, an error message is produced if their calculated lengths do not agree; the shorter of the two lengths is used. If PICIN or PICOUT is not coded for the field definition, a character definition of the field is automatically generated regardless of other operands that are coded, such as ATTRB=NUM.

Note: The valid picture values for COBOL input maps are:

A P S V X 9/and (

The valid picture values for PL/I input maps are:

A B E F G H I K M P R S T V X Y and Z 1 2 3 6 7 8 9/+−, .* $ and (

For PL/I, a currency symbol can be used as a picture character. The symbol can be any sequence of characters enclosed in <and>, for example <DM>.

Refer to the appropriate language reference manual for the correct syntax of the PICTURE attribute.

PICOUT (COBOL and PL/I only) is similar to PICIN, except that a picture to be applied to an output field in the OUT or INOUT map is generated.

The valid picture values for COBOL output maps are:

A B E P S V X Z 0 9 , . + − $ CR DB / and (

The valid picture values for PL/I output maps are:

A B E F G H I K M P R S T V X Y and Z 1 2 3 6 7 8 9 /+−$ CR DB and (

For PL/I, a currency symbol can be used as a picture character. The symbol can be any sequence of characters enclosed in <and>, for example <DM>.

Refer to the appropriate language reference manual for the correct syntax of the PICTURE attribute.

Note: COBOL supports multiple currency signs and multi-character currency signs in PICTURE specifications.

The default currency picture symbol is the dollar sign ($), which represents the national currency symbol; for example the dollar ($), the pound (£), or the yen (Y).

The default currency picture symbol may be replaced by a different currency picture symbol that is defined in the SPECIAL NAMES clause. The currency sign represented by the picture symbol is defined in the same clause. For example:

---

SPECIAL NAMES.
CURRENCY SIGN IS 'S' WITH PICTURE SYMBOL '$'.
CURRENCY SIGN IS '£' WITH PICTURE SYMBOL '£'.
CURRENCY SIGN IS 'EUR' WITH PICTURE SYMBOL '#'.
WORKING STORAGE SECTION.
  01 USPRICE PIC $99.99.
  01 UKPRICE PIC £99.99.
  01 ECPRICE PIC #99.99.

---

LENGTH must be specified when PICOUT specifies a COBOL picture containing a currency symbol that will be replaced by a currency sign of length greater than 1.

POS specifies the location of a field. This operand specifies the individually addressable character location in a map at which the attribute byte that precedes the field is positioned.

number specifies the displacement (relative to zero) from the beginning of the map being defined.

(line,column) specify lines and columns (relative to one) within the map being defined.

The location of data on the output medium is also dependent on DFHMDI operands.

The first position of a field is reserved for an attribute byte. When supplying data for input mapping from non-3270 devices, the input data must allow space for this attribute byte. Input data must not start in column 1 but may start in column 2.

The POS operand always contains the location of the first position in a field, which is normally the attribute byte when communicating with the 3270. For the second and subsequent fields of a group, the POS operand points to an assumed attribute-byte position, ahead of the start of the data, even though no actual attribute byte is necessary. If the fields follow on immediately from one another, the POS operand should point to the last character position in the previous field in the group.

When a position number is specified that represents the last character position in the 3270, two special rules apply:

ATTRIB=IC should not be coded. The cursor can be set to location zero by using the CURSOR option of a SEND MAP, SEND CONTROL, or SEND TEXT command.

If the field is to be used in an output mapping operation with MAP=DATAONLY on the SEND MAP command, an attribute byte for that field must be supplied in the symbolic map data structure by the application program.

PS specifies that programmed symbols are to be used. This overrides any PS operand set by the DFHMDI macro or the DFHMSD macro.

BASE is the default and specifies that the base symbol set is to be used.

psid specifies a single EBCDIC character, or a hexadecimal code of the form X'nn', that identifies the set of programmed symbols to be used.

The PS operand is ignored unless the terminal supports programmed symbols.

SOSI indicates that the field may contain a mixture of EBCDIC and DBCS data. The DBCS subfields within an EBCDIC field are delimited by SO (shift out) and SI (shift in) characters. SO and SI both occupy a single screen position (normally displayed as a blank). They can be included in any non-DBCS field on output, if they are correctly paired. The terminal user can transmit them inbound if they are already present in the field, but can add them to an EBCDIC field only if the field has the SOSI attribute.

TRANSP determines whether the background of an alphanumeric field is transparent or opaque, that is, whether an underlying (graphic) presentation space is visible between the characters.

Private Attributes:
length: int
justify: justifyvalues
occurs: int
init: initValue
grpName: String
pos: int
validn: validnValues
picIn: String
picOut: String
caSe: caseValue
fieldName: String=" "
ps: psValue="BASE"
sosi: yesno="NO"
transp: yesno="YES"

BMSMapAttributes
  COLOR
    indicates the individual color, or the default color for the mapset (where applicable). This is overridden by the COLOR operand of the DFHMDF macro.
    The valid colors are blue, red, pink, green, turquoise, yellow, and neutral.
    The COLOR operand is ignored unless the terminal supports color, as indicated by the RDO TYPE-TERM definition option COLOR(YES)>
  NUMBER is the column from the left or right page margin where the left or right map margin is to be established.

NEXT indicates that the left or right map margin is to be placed in the next available column from the left or right on the current line.

SAME indicates that the left or right map margin is to be established in the same column as the last non-header or nontrailer map used that specified COLUMN=number and the same JUSTIFY operands as this macro.

For input operations, the map is positioned at the extreme left-hand or right-hand side, depending on whether JUSTIFY=LEFT or JUSTIFY=RIGHT has been specified.

CTRL defines characteristics of IBM 3270 terminals. Use of any of the control options in the SEND MAP command overrides all control options in the DFHMDI macro, which in turn overrides all control options in the DFHMSD macro.

If CTRL is used with cumulative BMS paging (that is, the ACCUM option is used on the BMS SEND MAP commands), it must be specified on the last (or only) map of a page, unless it is overridden by the ALARM, FREEKB and so on, options on the SEND MAP or accumulated SEND CONTROL command.

PRINT must be specified if the printer is to be started; if omitted, the data is sent to the printer buffer but is not printed. This operand is ignored if the mapset is used with 3270 displays without the Printer Adapter feature.

LENGTH indicates the line length on the printer; length can be specified as L40, L64, L80, or HONEOM. L40, L64, and L80 force a new line after 40, 64, or 80 characters, respectively. HONEOM causes the default printer line length to be used. If this option is omitted, BMS sets the line length from the TCT page size.

FREEKB causes the keyboard to be unlocked after the map is written.

If FREEKB is not specified, the keyboard remains locked; data entry from the keyboard is inhibited until this status is changed.

ALARM activates the 3270 audible alarm. For non-3270 VTAM terminals it sets the alarm flag in the FMH. (This feature is not supported by interactive and batch logical units.)

FRSET specifies that the modified data tags (MDTs) of all fields currently in the 3270 buffer are to be reset to an unmodified condition (that is, field reset) before map data is written to the buffer. This allows the DFHMDF macro with the ATTRB operand to control the final status of any fields written or rewritten in response to a BMS command.

Note: CTRL cannot be specified in the DFHMDI and DFHMSD macros in the same mapset.

CURSLOC indicates that for all RECEIVE MAP operations using this map on 3270 terminals, BMS sets a flag in the application data structure element for the field where the cursor is located.

The flag may be tested by DFHBMCUR

Notes:

1. If CURSLOC=YES is specified for the MAP definitions, and there is no data for any field of the application data structure, but the cursor lies within a field known to the application data structure, BMS sets the cursor flag for the appropriate field, but the data for all fields in the application data structure is null, and the MAPFAIL condition does not occur. The unmapped data stream is not available to the application program unless it is a RECEIVE DATA FROM request.

2. A valid CURSLOC definition in DFHMDI overrides the definition in DFHMSD.

DSATTS specifies the attribute types to be included in the symbolic description map. These types can be one or more of the following: COLOR, HILIGHT, OUTLINE, PS, SOSI, TRANSP, and VALIDN.

Any type included in DSATTS should also be included in MAPATTS.

EXTATT this operand is supported for compatibility with previous releases. Each of the extended attributes can be defined individually. For new maps, the operands DSATTS and MAPATTS should be used instead.

NO is equivalent to specifying neither the DSATTS operand nor the MAPATTS operand.

YES is equivalent to:

MAPATTS=(COLOR,HILIGHT,PS,VALIDN)

DSATTS=(COLOR,HILIGHT,PS ,VALIDN)

MAPONLY is equivalent to:
MAPATTS=(COLOR,HILIGHT,PS,VALIDN)

FIELDS specifies whether or not the map contains fields. If you specify

FIELDS=NO, you create a null map that defines a "hole" in BMS's view of the screen. BMS cannot change the contents of such a hole after it has created it by sending a null map.

FLDSEP specifies the field separator sequence (1-4 characters) for input from non-3270 devices. Input from non-3270 devices can be entered as a single string of data with the field separator sequence delimiting fields. The data between the field separators is moved to the input fields in the map in order.

HEADER allows the map to be used during page building without terminating the

OVERFLOW condition. This operand may be specified for more than one map in a mapset.

HILIGHT specifies the default highlighting attribute for all fields in all maps in a mapset. This is overridden by the HILIGHT operand of the DFHMDF.

OFF is the default and indicates that no highlighting is used.

BLINK specifies that the field must blink.

REVERSE specifies that the character or field is displayed in reverse video, for example, on a 3278, black characters on a green background.

UNDERLINE specifies that a field is underlined.

The HILIGHT operand is ignored unless the terminal supports highlighting, as indicated by HILIGHT (YES) on the RDO TYPETERM definition, JUSTIFY
specifies the position of the map on the page.
LEFT specifies that the map is to be positioned starting at the specified column from the left margin on the specified line.
RIGHT specifies that the map is to be positioned starting at the specified column from the right margin on the specified line.
FIRST specifies that the map is to be positioned as the first map on a new page. Any partially formatted page from preceding BMS commands is considered to be complete. This operand can be specified for only one map per page.
LAST indicates that the map is to be positioned at the bottom of the current page. This operand can be specified for multiple maps to be placed on one page. However, maps other than the first map for which it is specified must be able to be positioned horizontally without requiring that more lines be used.
BOTTOM for a SEND MAP ACCUM command has the same effect as LAST, above. For a SEND MAP command (without ACCUM) and a
RECEIVE
MAP command, JUSTIFY=BOTTOM positions the map at the bottom of the screen if the number of lines in the map is specified in the SIZE operand. No account is taken of trailer maps in the mapset. JUSTIFY=BOTTOM is equivalent to specifying
LINE=(screendepth-mapdepth+1)
on the map definition, but it allows the same map to be used for different screen sizes. JUSTIFY=BOTTOM is ignored if the number of lines is not also specified. If JUSTIFY=BOTTOM and
LINE are both specified, the value specified in LINE is ignored.
LEFT and RIGHT are mutually exclusive, as are FIRST and LAST. If neither FIRST nor LAST is specified, the data is mapped at the next available position as determined by other parameters of the map definition and the current mapping operation. FIRST or LAST is ignored
unless ACCUM is specified on SEND MAP commands; otherwise only one map is placed on each page.
Note: If a field is initialized by an output map or contains data from any other source, data that is keyed as input overwrites only the equivalent length of the existing data; surplus existing data remains in the field and could cause unexpected interpretation of the new data.
LINE specifies the starting line on a page in which data for a map is to be formatted.
NUMBER is a value in the range 1-240, specifying a starting line number. A request to map, on a line and column, data that has been formatted in response to a preceding BMS command, causes the current page to be treated as though complete. The new data is formatted at the requested line and column on a new page.
NEXT specifies that formatting of data is to begin on the next available completely empty line. If LINE=NEXT is specified in the DFHMDI macro, it is ignored for input operations and LINE=1 is assumed.
SAME specifies that formatting of data is to begin on the same line as that used for a preceding BMS command. If COLUMN=NEXT is specified, it is ignored for input operations
and COLUMN=1 is assumed. If the data does not fit on the same line, it is placed on the next available line that is completely empty.
MAPATTS
specifies the attribute types to be included in the physical map. These types can be one or more of the following: COLOR, HILIGHT, OUTLINE, PS, SOSI, TRANSP, and VALIDN. This list must include all the
attribute types to be specified for individual fields in the map (DFHMDF macro).
Where possible these values are deduced from operands already specified in the DFHMDI and DFHMSD macros. For example, if COLOR=BLUE has been specified, MAPATTS=COLOR is assumed.
OBFMT specifies whether outboard formatting is to be used. This operand is available only for 3650 logical units, or for an 8100 series processor running DPS Release 2 and defined to CICS as an LUTYPE2 logical unit.
For more information, see the CICS Application Programming Guide
The OBFMT operand overrides the OBFMT operand on the DFHMSD macro.
YES specifies that this map definition can be used in outboard formatting.
NO specifies that this map definition cannot be used in outboard formatting.
OUTLINE
allows lines to be included above, below, to the left, or to the right of a field. You can use these lines in any combination to construct boxes around fields or groups of fields.
PARTN
specifies the default partition to be associated with maps in this mapset. If the ACTIVATE option is specified, the specified partition is also activated when maps in this mapset are output to a terminal that supports partitions.
This option overrides the PARTN option of the DFHMSD macro and is
overridden by any OUTPARTN or ACTPARTN option on the SEND MAP command,
or the INPARTN option on a RECEIVE MAP command.
The PARTN option is ignored if the target terminal does not support partitions, or if there is no partition set associated with the transaction.
PS
specifies that programmed symbols are to be used. This overrides the PS operand of the DFHMSD macro and is overridden by the PS operand of
the DFHMDF macro.
BASE specifies that the base symbol set is to be used.
psid specifies a single EBCDIC character, or a hexadecimal code of the form X'nn', that identifies the set of programmed symbols to be used.
The PS operand is ignored unless the terminal supports programmed symbols, as indicated by the PROGSYMBOLS(YES) on the RDO TYPETERM definition.

SIZE
   specifies the size of a map.
   line is a value in the range 1-240, specifying the depth of a map as a number of lines.
   column is a value in the range 1-240, specifying the width of a map as a number of columns.
   This operand is required in the following cases:
   An associated DFHMDF macro with the POS operand is used.
   The map is to be referred to in a SEND MAP command with the ACCUM option.
   The map is to be used when referring to input data from other than a 3270 terminal in a RECEIVE MAP command.
SOSI
   indicates that the field may contain a mixture of EBCDIC and DBCS data. The DBCS subfields within an EBCDIC field are delimited by
SO
   (shift out) and SI (shift in) characters. SO and SI both occupy a single screen position (normally displayed as a blank). They can be included in any non-DBCS field on output, if they are correctly paired. The terminal user can transmit them inbound if they are already present in the field, but can add them to an EBCDIC field only
   if the field has the SOSI attribute.
TERM
   kept for compatibility with previous releases.
TIOAPFX
   specifies whether BMS should include a filler in the symbolic description maps to allow for the unused TIOA prefix. This operand overrides the TIOAPFX operand specified for the DFHMSD macro.
   YES specifies that the filler should be included in the symbolic description maps. If TIOAPFX=YES is specified, all maps within the mapset have the filler. TIOAPFX=YES should always be used for command-level application programs.
   NO is the default and specifies that the filler is not to be included.
TRAILER
   allows the map to be used during page building without terminating the OVERFLOW condition. This operand may be specified for more than one
   map in a mapset. If a trailer map is used other than in the overflow environment, the space normally reserved for overflow trailer maps is not reserved while mapping the trailer map.
TRANSP
   determines whether the background of an alphanumeric field is transparent or opaque, that is, whether an underlying (graphic) presentation space is visible between the characters.
VALIDN specifies that validation is to be used on an 8775 terminal and this field can be processed by the BMS global user exits. This is overridden by the VALIDN operand of the DFHMDF macro, and overrides the VALIDN operand of the DFHMSD macro.
   MUSTFILL specifies that the field must be filled completely with data. An attempt to move the cursor from the field before it has been filled, or to transmit data from an incomplete field, raises the INHIBIT INPUT condition.
   MUSTENTER specifies that data must be entered into the field, though need not fill it. An attempt to move the cursor from an empty field raises the INHIBIT INPUT condition.
   TRIGGER specifies that this field is a trigger field.
   USEREXIT specifies that this field is to be processed by the BMS global user exits, XBMIN and XBMOUT, if this field is received or transmitted in a 3270 datastream when the respective exit is enabled.
   The MUSTFILL, MUSTENTER and TRIGGER specifications are valid only for terminals that support the field validation extended attribute, otherwise they are ignored. The USEREXIT specification applies to all 3270 devices.
Private Attributes:
ctrl: ctrlValues
color: colorValue="DEFAULT"
cursloc: yesno="NO"
hilight: hiLightValue
validn: validnValues
fields: fieldsValue
sosi: yesno="NO"
extatt: extattValue
mapatts: attrValues
dsatts: attrValues
outline: outlineValues
transp: yesno="YES"
justify: bottomValue
ps: psValue="BASE"
BMSMapSetAttributes
   Implemented by rest of DFHMSD macro
   ctrl=ctrlValues, Overrides all values in map and then values in field
   PRINT must be specified if printer to be started. If omitted data is sent to the print buffer. Operand is ignored if mapset is used with 3270 without Printer Adapter.
   hilight=highlightvalues. Is overridden by values in map and then values in field.
   validn . . . can only be used with 8775, is overridden by map and then field.
   column
   line
   fields
   sosi=yes/no. no is default. Fiels can contain a mixture of EBCDIC and DBCS data. Must be paired and included in SO/SI pairs. Can be transmitted inbound if present in field, can only add them to EBCDIC field if field has SOSI attribute.
   extatt
   mapatts=mapattsValues
   dsatts
   outline=outlineValues. Allows lines to be included above, below, left or right of a field.
   transp=yes/no. Determines whether background of alphanumeric field is transparent so background can be seen or opaque and therefore cannot.
   justify
   color=ColorValues. Is overridden by values in map and then by values in field . . .
Have not implemented Standard BMS
Operands:
PARTN=name,ACTIVATE
LDC=mnemonic
OBFMT=boolean
HTAB=tab
VTAB=tab
DATA=FIELD/BLOCK
FLDSEP=char/Xchar Special action taken for:
PS=, use of program symbol sets very low usage and means we may have to flow hex, output message to say ignored so set to FALSE
TIOAPFX, if NO result is a NOOP, if YES could ignore or add 12 byte FILLER at front of structure. YES must be used with Command Level programs.
STORAGE=AUTO, ignore because to do with storage allocaion in CICS
BASE=name, ignore because to do with storage allocation in CICS Derived from BMSMapSet
Private Attributes:
ctrl: ctrlValues
color: colorValue
hilight: hiLightValue
sosi: yesno="NO"
outline: outlineValues
transp: yesno="YES"
dsatts: attrbValues
extatt: extattValue="NO"
mapatts: attrbValues
validn: validnValues
cursioc: yesno="NO"
ps: psValue="BASE"
term: type="3270"
TOTALS:
1 Logical Packages
6 Classes
LOGICAL PACKAGE STRUCTURE
Logical View
  bms While the invention has been described with respect to certain preferred embodiments and exemplifications, it is not intended to limit the scope of the invention thereby, but solely by the claims appended hereto.

We claim:

1. A method of processing an application request on an end user application and an application server, the method comprising:
   a) initiating the application request on the end user application in a first language with a first application program;
   b) transmitting the application request to the application server and converting the application request from the first language of the first end user application to a form for a mapping support language running on the application server, wherein the end user application is connected to the application server through a web server, the web server comprising a connector having invocation and transformation capabilities, wherein the connector comprises:
      1) a language metamodel to define data structures that represent connector interfaces, wherein the language metamodel indicates a source language, a target language, and a mapping between the source language and the target language, wherein the language metamodel comprises declaration text that is not editable;
      2) a type descriptor metamodel that is language neutral and that defines a physical realization, a storage mapping, and a plurality of constraints, wherein the type descriptor metamodel provides a physical representation of individual fields of a given data structure, wherein the type descriptor metamodel provides data types mapping between languages;
      3) invocation metamodel data;
      4) application domain interface metamodel data;
      5) transaction message metamodel data; and
      6) type descriptor metamodel data;
   and wherein the connector is configured to (i) convert the application request from the first language of the first end user application as a source language to the language running on the application server as a target language, and (ii) convert a response to the application request from the language running on the application server as a source language to the first language of the first end user application as a target language, each conversion comprising:
      1) invoking connector metamodels of respective source language and target mapping support language;
      2) populating the connector metamodels with metamodel data of each of the respective source language and target mapping support language, the metamodel data comprising IBM 3270 terminal (3270) screen formatting for 3270-based applications, the metamodel data comprising a Basic Mapping Support (BMS) map, a BMS mapset, a BMS mapfield, and BMS attributes, wherein the BMS map set comprises a plurality of programming attributes, wherein the programming attributes comprise a storage operand that varies based on a language of an application program, wherein the BMS attributes comprise a control attribute that defines characteristics of 3270 terminals, and an alarm attribute that activates a 3270 audible alarm; and
      3) converting the source language to the mapping support language;
   c) processing said application request on the application server;
   d) converting a response to the application request from the mapping support language running on the application server to the first language of the first end user application; and
   e) transmitting the response to the application request from the application server to the end user application.

2. The method of claim 1 wherein the connector uses BMS metadata for interpretive marshaling.

3. The method of claim 1 wherein the connector uses adapters.

4. A computer-program product which when executed by a processor processes an application request on an end user application and an application server, the computer-program product comprising a storage medium tangibly embodying computer readable program code, the computer program product comprising:
   a) code for initiating the application request on the end user application in a first language with a first application program;
   b) code for transmitting the application request to the application server and converting the application request from the first language of the first end user application to a form for a mapping support language running on the application server, wherein the end user application is connected to the application server through a web server, the web server comprising a connector having invocation and transformation capabilities, wherein the connector comprises:
      1) a language metamodel to define data structures that represent connector interfaces, wherein the language metamodel indicates a source language, a target language, and a mapping between the source language and the target language, wherein the language metamodel comprises declaration text that is not editable;
      2) a type descriptor metamodel that is language neutral and that defines a physical realization, a storage mapping, and a plurality of constraints, wherein the type descriptor metamodel provides a physical representation of individual fields of a given data structure, wherein the type descriptor metamodel provides data types mapping between languages;
3) invocation metamodel data;
4) application domain interface metamodel data;
5) transaction message metamodel data; and
6) type descriptor metamodel data;

and wherein the connector is configured to (i) convert the application request from the first language of the first end user application as a source language to the language running on the application server as a target language, and (ii) convert a response to the application request from the language running on the application server as a source language to the first language of the first end user application as a target language, each comprising:
1) code for invoking connector metamodels of respective source language and target mapping support language;
2) code for populating the connector metamodels with metamodel data of each of the respective source language and target mapping support language, the metamodel data comprising IBM 3270 terminal (3270) screen formatting for 3270-based applications, the metamodel data comprising a Basic Mapping Support (BMS) map, a BMS mapset, a BMS mapfield, and BMS attributes, wherein the BMS mapset comprises a plurality of programming attributes, wherein the programming attributes comprise a storage operand that varies based on a language of an application program, wherein the BMS attributes comprise a control attribute that defines characteristics of 3270 terminals, and an alarm attribute that activates a 3270 audible alarm; and
3) code for converting the source language to the mapping support language;
c) code for processing said application request on the application server;
d) converting a response to the application request from the mapping support language running on the application server to the first language of the first end user application; and
e) code for transmitting the response to the application request from the application server to the end user application.

5. The computer-program product of claim 4 wherein the connector uses BMS metadata for interpretive marshaling.

6. The computer-program product of claim 4 wherein the connector uses adapters.

7. A computer-implemented method of processing an application request, the method comprising:
a) receiving, by the application server, an application request initiated on the end user application in a first language with a first application program;
b) converting the application request from the first language of the first end user application to a form for a mapping support language running on the application server, wherein the end user application is connected to the application server through a web server, the web server comprising a connector that has invocation and transformation capabilities, wherein the connector comprises:
1) a language metamodel to define data structures that represent connector interfaces, wherein the language metamodel indicates a source language, a target language, and a mapping between the source language and the target language, wherein the language metamodel comprises declaration text that is not editable;
2) a type descriptor metamodel that is language neutral and that defines a physical realization, a storage mapping, and a plurality of constraints, wherein the type descriptor metamodel provides a physical representation of individual fields of a given data structure, wherein the type descriptor metamodel provides data types mapping between languages;
3) invocation metamodel data;
4) application domain interface metamodel data;
5) transaction message metamodel data; and
6) type descriptor metamodel data;

wherein the connector is configured to (i) convert the application request from the first language of the first end user application as a source language to the language running on the application server as a target language, and (ii) convert a response to the application request from the language running on the application server as a source language to the first language of the first end user application as a target language, each conversion comprising:
1) invoking connector metamodels of respective source language and target mapping support language;
2) populating the connector metamodels with metamodel data of each of the respective source language and target mapping support language, the metamodel data comprising a Basic Mapping Support (BMS) map, a BMS map set, a BMS mapfield, and BMS attributes, wherein the BMS map set comprises a plurality of programming attributes including a storage operand that varies based on a language of an application program, wherein the BMS attributes comprise a control attribute that defines characteristics of terminals of a specific type; and
3) converting the source language to the mapping support language;
c) processing said application request on the application server;
d) converting a response to the application request from the mapping support language running on the application server to the first language of the first end user application; and
e) transmitting the response to the application request from the application server to the end user application.

* * * * *